US010353359B1

(12) United States Patent
Jordan, II et al.

(10) Patent No.: US 10,353,359 B1
(45) Date of Patent: Jul. 16, 2019

(54) SYSTEMS AND METHODS FOR MANAGING SMART DEVICES BASED UPON ELECTRICAL USAGE DATA

(71) Applicant: STATE FARM MUTUAL AUTOMOBILE INSURANCE COMPANY, Bloomington, IL (US)

(72) Inventors: Jackie O. Jordan, II, Bloomington, IL (US); John Donovan, Bloomington, IL (US); David Turrentine, Bloomington, IL (US); Torri Wollenschlager, Bloomington, IL (US); Bryan R. Nussbaum, Bloomington, IL (US); Deanna Stockweather, Normal, IL (US); Jeffrey W. Stoiber, Bloomington, IL (US); Kerstin Markwardt, Phoenix, AZ (US); Gail L. Carlson, Bloomington, IL (US); Kyle C. Schiebel, Bloomington, IL (US); Troy Winslow, Bloomington, IL (US); Joseph P. Harr, Bloomington, IL (US); Ellakate Wagner, Bloomington, IL (US); Michael Harris, Jr., Normal, IL (US); Jennylind Sun, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 395 days.

(21) Appl. No.: 14/873,914

(22) Filed: Oct. 2, 2015

Related U.S. Application Data

(60) Provisional application No. 62/060,962, filed on Oct. 7, 2014, provisional application No. 62/105,407, filed
(Continued)

(51) Int. Cl.
G05B 15/02 (2006.01)
G06Q 40/08 (2012.01)
H04L 12/28 (2006.01)

(52) U.S. Cl.
CPC ............. *G05B 15/02* (2013.01); *G06Q 40/08* (2013.01); *H04L 12/2818* (2013.01)

(58) Field of Classification Search
CPC ........ G05B 15/00; G05B 15/02; G06Q 40/00; G06Q 40/08; G06Q 50/00; G06Q 50/06;
(Continued)

(56) References Cited

U.S. PATENT DOCUMENTS 3,817,161 A 6/1974 Koplon
3,875,612 A 4/1975 Poitras
(Continued)

FOREIGN PATENT DOCUMENTS

CN 202865924 U 4/2013
WO WO-2013/076721 A1 5/2013
WO WO-2014/207558 A2 12/2014

OTHER PUBLICATIONS

U.S. Appl. No. 14/692,864, Nonfinal Office Action, dated May 16, 2017.
(Continued)

Primary Examiner — Umut Onat
(74) Attorney, Agent, or Firm — Marshall, Gerstein & Borun LLP; Randall G. Reuth

(57) ABSTRACT

Systems and methods for managing the operation of devices within a home or other property based upon electrical usage data. With customer knowledge or consent, a home controller may retrieve and analyze electrical usage data corresponding to a device, such as by comparing it to certain threshold data. If the analysis results in a trigger condition, the controller may generate a command, and transmit the
(Continued)

command to the device for implementation, allowing modification of device operation to address any issues indicated in the electrical usage data. The controller may also notify a home owner/occupant. As a result, faulty devices may be managed prior to their faults causing damage to the device and/or the property, and/or property owners may be timely prompted to investigate, repair, and/or replace a failing device. Insurance discounts may be provided based upon the risk mitigation/prevention functionality.

6 Claims, 6 Drawing Sheets

Related U.S. Application Data on Jan. 20, 2015, provisional application No. 62/187,642, filed on Jul. 1, 2015, provisional application No. 62/187,645, filed on Jul. 1, 2015, provisional application No. 62/187,666, filed on Jul. 1, 2015, provisional application No. 62/187,624, filed on Jul. 1, 2015, provisional application No. 62/187,651, filed on Jul. 1, 2015, provisional application No. 62/189,329, filed on Jul. 7, 2015, provisional application No. 62/193,317, filed on Jul. 16, 2015, provisional application No. 62/197,343, filed on Jul. 27, 2015, provisional application No. 62/198,813, filed on Jul. 30, 2015, provisional application No. 62/200,375, filed on Aug. 3, 2015, provisional application No. 62/201,671, filed on Aug. 6, 2015, provisional application No. 62/220,383, filed on Sep. 18, 2015.

(58) Field of Classification Search
CPC .............. Y02B 70/30; Y02B 70/3216; Y02B 70/3225; Y02B 70/3233; Y02B 70/346
See application file for complete search history.

(56) References Cited

U.S. PATENT DOCUMENTS

| | | | |
|---|---|---|---|
| 5,099,751 | A | 3/1992 | Newman et al. |
| 5,128,859 | A | 7/1992 | Carbone et al. |
| 5,554,433 | A | 9/1996 | Perrone, Jr. et al. |
| 5,903,426 | A | 5/1999 | Ehling |
| 6,023,762 | A | 2/2000 | Dean et al. |
| 6,155,324 | A | 12/2000 | Elliott et al. |
| 6,222,455 | B1 | 4/2001 | Kaiser |
| 6,526,807 | B1 | 3/2003 | Doumit et al. |
| 6,812,848 | B2 | 11/2004 | Candela |
| 7,030,767 | B2 | 4/2006 | Candela |
| 7,194,416 | B1 | 3/2007 | Provost et al. |
| 7,309,216 | B1 | 12/2007 | Spadola, Jr. et al. |
| 7,348,882 | B2 | 3/2008 | Adamczyk et al. |
| 7,598,856 | B1 | 10/2009 | Nick et al. |
| 7,715,036 | B2 | 5/2010 | Silverbrook et al. |
| 7,809,587 | B2 | 10/2010 | Dorai et al. |
| 7,813,822 | B1 | 10/2010 | Hoffberg |
| 7,882,514 | B2 * | 2/2011 | Nielsen ............... H04H 60/32 725/14 |
| 8,031,079 | B2 | 10/2011 | Kates |
| 8,041,636 | B1 | 10/2011 | Hunter et al. |
| 8,106,769 | B1 | 1/2012 | Maroney et al. |
| 8,108,271 | B1 | 1/2012 | Duncan et al. |
| 8,229,861 | B1 | 7/2012 | Trandal et al. |
| 8,280,633 | B1 | 10/2012 | Eldering et al. |
| 8,289,160 | B1 | 10/2012 | Billman |
| 8,316,237 | B1 | 11/2012 | Felsher et al. |
| 8,400,299 | B1 | 3/2013 | Maroney et al. |
| 8,510,196 | B1 | 8/2013 | Brandmaier et al. |
| 8,527,306 | B1 | 9/2013 | Reeser et al. |
| 8,533,144 | B1 | 9/2013 | Reeser et al. |
| 8,595,034 | B2 | 11/2013 | Bauer et al. |
| 8,596,293 | B2 | 12/2013 | Mous et al. |
| 8,605,209 | B2 | 12/2013 | Becker |
| 8,620,841 | B1 | 12/2013 | Filson et al. |
| 8,621,097 | B2 | 12/2013 | Venkatakrishnan et al. |
| 8,650,048 | B1 | 2/2014 | Hopkins et al. |
| 8,694,501 | B1 | 4/2014 | Trandal et al. |
| 8,712,893 | B1 | 4/2014 | Brandmaier et al. |
| 8,730,039 | B1 | 5/2014 | Billman |
| 8,731,975 | B2 | 5/2014 | English et al. |
| 8,749,381 | B1 | 6/2014 | Maroney et al. |
| 8,798,289 | B1 * | 8/2014 | Every ................. G06F 1/325 381/94.1 |
| 9,049,168 | B2 | 6/2015 | Jacob et al. |
| 9,280,252 | B1 | 3/2016 | Brandmaier et al. |
| 9,297,150 | B2 | 3/2016 | Klicpera |
| 9,424,606 | B2 | 8/2016 | Wilson, II et al. |
| 9,429,925 | B2 | 8/2016 | Wait |
| 9,652,976 | B2 | 5/2017 | Bruck et al. |
| 9,654,434 | B2 | 5/2017 | Sone et al. |
| 9,824,397 | B1 | 11/2017 | Patel et al. |
| 9,892,463 | B1 | 2/2018 | Hakimi-Boushehri et al. |
| 9,898,912 | B1 | 2/2018 | Jordan, II et al. |
| 2002/0040306 | A1 | 4/2002 | Sugiyama et al. |
| 2004/0054789 | A1 | 3/2004 | Breh et al. |
| 2004/0177032 | A1 | 9/2004 | Bradley et al. |
| 2004/0211228 | A1 | 10/2004 | Nishio et al. |
| 2005/0030175 | A1 | 2/2005 | Wolfe |
| 2005/0080520 | A1 | 4/2005 | Kline et al. |
| 2005/0139420 | A1 | 6/2005 | Spoltore et al. |
| 2005/0251427 | A1 | 11/2005 | Dorai et al. |
| 2005/0275527 | A1 | 12/2005 | Kates |
| 2006/0033625 | A1 | 2/2006 | Johnson et al. |
| 2006/0100912 | A1 | 5/2006 | Kumar et al. |
| 2006/0154642 | A1 | 7/2006 | Scannell |
| 2006/0184379 | A1 | 8/2006 | Tan et al. |
| 2008/0018474 | A1 | 1/2008 | Bergman et al. |
| 2008/0019392 | A1 | 1/2008 | Lee |
| 2008/0184272 | A1 | 7/2008 | Brownewell |
| 2008/0285797 | A1 | 11/2008 | Hammadou |
| 2009/0001891 | A1 | 1/2009 | Patterson |
| 2009/0044595 | A1 | 2/2009 | Vokey |
| 2009/0094129 | A1 | 4/2009 | Rhodes et al. |
| 2009/0174364 | A1 * | 7/2009 | Onishi ................. H02J 7/025 320/108 |
| 2009/0243852 | A1 | 10/2009 | Haupt et al. |
| 2009/0259581 | A1 | 10/2009 | Horowitz et al. |
| 2009/0265193 | A1 | 10/2009 | Collins et al. |
| 2010/0073840 | A1 | 3/2010 | Hennessey, Jr. |
| 2010/0235285 | A1 | 9/2010 | Hoffberg |
| 2010/0299217 | A1 | 11/2010 | Hui |
| 2011/0003577 | A1 | 1/2011 | Rogalski et al. |
| 2011/0077875 | A1 | 3/2011 | Tran et al. |
| 2011/0112660 | A1 | 5/2011 | Bergmann et al. |
| 2011/0161117 | A1 | 6/2011 | Busque et al. |
| 2011/0270453 | A1 * | 11/2011 | Kalogridis ............ H02J 3/14 700/291 |
| 2012/0016695 | A1 | 1/2012 | Bernard et al. |
| 2012/0101855 | A1 | 4/2012 | Collins et al. |
| 2012/0116820 | A1 | 5/2012 | English et al. |
| 2012/0166115 | A1 * | 6/2012 | Apostolakis ........... G06Q 50/06 702/62 |
| 2012/0188081 | A1 | 7/2012 | Van Katwijk |
| 2012/0265586 | A1 * | 10/2012 | Mammone ............ G06Q 30/02 705/14.1 |
| 2012/0290333 | A1 | 11/2012 | Birchall |
| 2012/0311620 | A1 * | 12/2012 | Conklin ................ H04H 60/32 725/14 |
| 2013/0049950 | A1 | 2/2013 | Wohlert |
| 2013/0096960 | A1 | 4/2013 | English et al. |
| 2013/0144486 | A1 | 6/2013 | Ricci |
| 2013/0159021 | A1 | 6/2013 | Felsher |
| 2013/0226624 | A1 | 8/2013 | Blessman et al. |
| 2013/0234840 | A1 | 9/2013 | Trundle et al. |
| 2013/0257626 | A1 | 10/2013 | Masli et al. |
| 2013/0290033 | A1 | 10/2013 | Reeser et al. |
| 2014/0122133 | A1 | 5/2014 | Weisberg et al. |
| 2014/0136242 | A1 | 5/2014 | Weekes et al. |
| 2014/0180723 | A1 | 6/2014 | Cote et al. |

(56) References Cited

U.S. PATENT DOCUMENTS

| | | | |
|---|---|---|---|
| 2014/0201315 A1* | 7/2014 | Jacob | H04L 12/2803 709/217 |
| 2014/0201844 A1 | 7/2014 | Buck | |
| 2014/0222329 A1 | 8/2014 | Frey | |
| 2014/0222469 A1 | 8/2014 | Stahl et al. | |
| 2014/0238511 A1 | 8/2014 | Klicpera | |
| 2014/0244997 A1 | 8/2014 | Goel et al. | |
| 2014/0266717 A1 | 9/2014 | Warren et al. | |
| 2014/0278571 A1 | 9/2014 | Mullen et al. | |
| 2014/0303801 A1* | 10/2014 | Ahn | H02J 3/14 700/295 |
| 2014/0340216 A1 | 11/2014 | Puskarich | |
| 2014/0358592 A1 | 12/2014 | Wedig et al. | |
| 2014/0379156 A1* | 12/2014 | Kamel | G05F 1/66 700/291 |
| 2015/0154712 A1 | 6/2015 | Cook | |
| 2015/0160623 A1 | 6/2015 | Holley | |
| 2015/0160636 A1 | 6/2015 | McCarthy, III et al. | |
| 2015/0163412 A1 | 6/2015 | Holley et al. | |
| 2015/0168976 A1* | 6/2015 | Loucks | H02J 9/061 700/287 |
| 2015/0170288 A1 | 6/2015 | Harton et al. | |
| 2015/0206249 A1 | 7/2015 | Fini | |
| 2015/0287310 A1 | 10/2015 | Deliuliis et al. | |
| 2015/0332407 A1 | 11/2015 | Wilson, II et al. | |
| 2015/0364028 A1 | 12/2015 | Child et al. | |
| 2016/0018226 A1 | 1/2016 | Plocher et al. | |
| 2016/0042463 A1 | 2/2016 | Gillespie | |
| 2016/0078744 A1 | 3/2016 | Gieck | |
| 2016/0104250 A1 | 4/2016 | Allen et al. | |
| 2017/0147722 A1 | 5/2017 | Greenwood | |
| 2017/0304659 A1 | 10/2017 | Chen et al. | |

OTHER PUBLICATIONS

U.S. Appl. No. 14/692,946, Nonfinal Office Action, dated Apr. 4, 2017.
U.S. Appl. No. 14/692,961, Nonfinal Office Action, dated Apr. 14, 2017.
U.S. Appl. No. 14/693,021, Nonfinal Office Action, dated Jun. 30, 2017.
U.S. Appl. No. 14/693,034, Nonfinal Office Action, dated May 17, 2017.
U.S. Appl. No. 14/693,039, Nonfinal Office Action, dated Jun. 5, 2017.
U.S. Appl. No. 14/693,057, Nonfinal Office Action, dated Aug. 21, 2017.
U.S. Appl. No. 14/873,823, Final Office Action, dated Mar. 15, 2017.
U.S. Appl. No. 14/873,823, Nonfinal Office Action, dated Jun. 21, 2017.
U.S. Appl. No. 14/873,823, Nonfinal Office Action, dated Nov. 30, 2016.
U.S. Appl. No. 14/692,943, Nonfinal Office Action, dated Sep. 12, 2017.
U.S. Appl. No. 14/692,961, Final Office Action, dated Sep. 1, 2017.
U.S. Appl. No. 14/693,032, Nonfinal Office Action, dated Sep. 7, 2017.
U.S. Appl. No. 14/873,864, Notice of Allowance, dated Aug. 28, 2017.
U.S. Appl. No. 14/873,864, Final Office Action, dated Dec. 2, 2016.
U.S. Appl. No. 14/873,864, Nonfinal Office Action, dated Apr. 5, 2017.
U.S. Appl. No. 14/873,864, Nonfinal Office Action, dated Jul. 14, 2016.
Knutsen, Confusion about causation in insurance: solutions for catastrophic losses, Ala. L. Rev., 5:957-1023 (2010).
U.S. Appl. No. 14/692,864, Final Office Action, dated Nov. 8, 2017.
U.S. Appl. No. 14/692,946, Final Office Action, dated Oct. 30, 2017.
U.S. Appl. No. 14/692,953, Nonfinal Office Action, dated Sep. 19, 2017.
U.S. Appl. No. 14/692,961, Nonfinal Office Action, dated Dec. 28, 2017.
U.S. Appl. No. 14/693,034, Notice of Allowance, dated Oct. 25, 2017.
U.S. Appl. No. 14/693,039, Final Office Action, dated Dec. 15, 2017.
U.S. Appl. No. 14/873,722, Nonfinal Office Action, dated Dec. 5, 2017.
U.S. Appl. No. 14/873,783, Nonfinal Office Action, dated Dec. 8, 2017.
U.S. Appl. No. 14/873,823, Final Office Action, dated Nov. 3, 2017.
U.S. Appl. No. 14/873,864, Notice of Allowance, dated Dec. 21, 2017.
U.S. Appl. No. 14/873,942, Nonfinal Office Action, dated Nov. 22, 2017.
U.S. Appl. No. 14/693,021, Final Office Action, dated Jan. 25, 2018.
U.S. Appl. No. 14/873,864, Corrected Notice of Allowance, dated Jan. 18, 2018.
U.S. Appl. No. 14/693,057, Final Office Action, dated Feb. 7, 2018.
U.S. Appl. No. 14/873,864, Corrected Notice of Allowability, dated Jan. 18, 2018.
U.S. Appl. No. 14/873,823, Nonfinal Office Action, dated Feb. 23, 2018.
System for Loss Prevention, IP.com, published Nov. 8, 2008.
U.S. Appl. No. 14/692,864, Nonfinal Office Action, dated May 24, 2018.
U.S. Appl. No. 14/692,943, Notice of Allowance, dated May 1, 2018.
U.S. Appl. No. 14/692,946, Nonfinal Office Action, dated Apr. 6, 2018.
U.S. Appl. No. 14/692,953, Final Office Action, dated Apr. 27, 2018.
U.S. Appl. No. 14/692,961, Final Office Action, dated Jun. 20, 2018.
U.S. Appl. No. 14/693,032, Final Office Action, dated Mar. 22, 2018.
U.S. Appl. No. 14/693,032, Notice of Allowance, dated Jun. 22, 2018.
U.S. Appl. No. 14/693,039, Nonfinal Office Action, dated May 3, 2018.
U.S. Appl. No. 14/873,722, Final Office Action, dated Jun. 15, 2018.
U.S. Appl. No. 14/873,783, Final Office Action, dated May 23, 2018.
U.S. Appl. No. 14/873,823, Final Office Action, dated Jun. 29, 2018.
U.S. Appl. No. 14/873,942, Nonfinal Office Action, dated Mar. 16, 2018.
U.S. Appl. No. 15/409,248, filed Jan. 18, 2017, Konrardy et al., "Sensor Malfunction Detection".
U.S. Appl. No. 15/409,271, filed Jan. 18, 2017, Konrardy et al., "Autonomous Vehicle Component Malfunction Impact Assessment".
U.S. Appl. No. 15/409,305, filed Jan. 18, 2017, Konrardy et al., "Component Malfunction Impact Assessment".
U.S. Appl. No. 15/409,318, filed Jan. 18, 2017, Konrardy et al., "Automatic Repair of Autonomous Vehicles".
U.S. Appl. No. 15/409,336, filed Jan. 18, 2017, Konrardy et al., "Automatic Repair of Autonomous Components".
U.S. Appl. No. 15/409,340, filed Jan. 18, 2017, Konrardy et al., "Autonomous Vehicle Damage and Salvage Assessment".
U.S. Appl. No. 15/409,349, filed Jan. 18, 2017, Konrardy et al., "Component Damage and Salvage Assessment".
U.S. Appl. No. 15/409,359, filed Jan. 18, 2017, Konrardy et al., "Detecting and Responding to Autonomous Vehicle Collisions".
U.S. Appl. No. 15/409,371, filed Jan. 18, 2017, Konrardy et al., "Detecting and Responding to Autonomous Environment Incidents".
U.S. Appl. No. 15/409,445, filed Jan. 18, 2017, Konrardy et al., "Virtual Testing of Autonomous Vehicle Control System".
U.S. Appl. No. 15/409,473, filed Jan. 18, 2017, Konrardy et al., "Virtual Testing of Autonomous Environment Control System".
U.S. Appl. No. 15/859,859, filed Jan. 2, 2018, Hakmi-Boushehri et al., "Systems and Methods for Community-Based Cause of Loss Determination".

(56) References Cited

OTHER PUBLICATIONS

U.S. Appl. No. 15/895,149, filed Feb. 13, 2018, Jordan et al., Systems and Methods for Automatically Generating an Escape Route.

* cited by examiner

SYSTEMS AND METHODS FOR MANAGING SMART DEVICES BASED UPON ELECTRICAL USAGE DATA

CROSS-REFERENCE TO RELATED APPLICATIONS

This application claims benefit of the filing date of U.S. Provisional Patent Application Nos. 62/060,962 (filed Oct. 7, 2014, and entitled "SYSTEMS AND METHODS FOR MANAGING DEVICES WITHIN A CONNECTED PROPERTY AND INSURANCE POLICIES ASSOCIATED THEREWITH"); 62/105,407 (filed Jan. 20, 2015, and entitled "SYSTEMS AND METHODS FOR MANAGING DEVICES WITHIN A CONNECTED PROPERTY AND INSURANCE POLICIES ASSOCIATED THEREWITH"); 62/187,624 (filed Jul. 1, 2015, and entitled "SYSTEMS AND METHODS FOR FACILITATING DEVICE REPLACEMENT WITHIN A CONNECTED PROPERTY"); 62/187,645 (filed Jul. 1, 2015, and entitled "SYSTEMS AND METHODS FOR MANAGING BUILDING CODE COMPLIANCE FOR A PROPERTY"); 62/187,651 (filed Jul. 1, 2015, and entitled "SYSTEMS AND METHODS FOR AUTOMATICALLY GENERATING AN ESCAPE ROUTE"); 62/187,642 (filed Jul. 1, 2015, and entitled "SYSTEMS AND METHODS FOR ANALYZING SENSOR DATA TO DETECT PROPERTY INTRUSION EVENTS"); 62/187,666 (filed Jul. 1, 2015, and entitled "SYSTEMS AND METHODS FOR IMPROVED ASSISTED OR INDEPENDENT LIVING ENVIRONMENTS"); 62/189,329 (filed Jul. 7, 2015, and entitled "SYSTEMS AND METHODS FOR MANAGING WARRANTY INFORMATION ASSOCIATED WITH DEVICES POPULATED WITHIN A PROPERTY"); 62/193,317 (filed Jul. 16, 2015, and entitled "SYSTEMS AND METHODS FOR MANAGING SMART DEVICES BASED UPON ELECTRICAL USAGE DATA"); 62/197,343 (filed Jul. 27, 2015, and entitled "SYSTEMS AND METHODS FOR CONTROLLING SMART DEVICES BASED UPON IMAGE DATA FROM IMAGE SENSORS"); 62/198,813 (filed Jul. 30, 2015, and entitled "SYSTEMS AND METHODS FOR MANAGING SERVICE LOG INFORMATION"); 62/200,375 (filed Aug. 3, 2015, and entitled "SYSTEMS AND METHODS FOR AUTOMATICALLY RESPONDING TO A FIRE"); 62/201,671 (filed Aug. 6, 2015, and entitled "SYSTEMS AND METHODS FOR AUTOMATICALLY MITIGATING RISK OF DAMAGE FROM BROKEN CIRCUITS"); 62/220,383 (filed Sep. 18, 2015, and entitled "METHODS AND SYSTEMS FOR RESPONDING TO A BROKEN CIRCUIT")—which are all hereby incorporated by reference in their entireties.

FIELD OF THE DISCLOSURE

The present disclosure generally relates to managing a connected property. More particularly, the present disclosure relates to facilitating various operations and functionalities associated with monitoring device electrical usage and facilitating device operation accordingly.

BACKGROUND

With the proliferation of the "internet of things," more household devices and items are gaining communication and network connectivity capabilities. The new capabilities are enabling easier data detection and more accurate information and metrics. However, the channels to control and maintain devices and items as a response to certain conditions are limited. Additionally, current insurance policy processing systems associated with homeowner and personal property insurance may not account for the connected devices and/or generally improve more accurate information.

BRIEF SUMMARY

The present embodiments may, inter alia, manage operation of connected devices and items in response to certain conditions and commands. Further, the present embodiments may effectively and efficiently communicate relevant information associated with connected devices and items. Additionally, the present embodiments may facilitate insurance processing associated with the connected devices and items based upon data received from the connected devices and items, among other functionalities. One particular functionality relates to monitoring electrical usage of the connected devices and facilitating device operation based upon electrical usage data.

Generally, the present embodiments may relate to (1) home control and/or automation, as well as (2) loss prevention, reduction, and/or mitigation through proactively managing device operation based upon electrical usage data, and/or notifying an individual of device operation and electrical usage data. The foregoing functionality may also be used by an insurance provider to generate, update, or adjust insurance policies, premiums, rates, discounts, points, and/or rewards, and/or make recommendations to an insured individual.

According to one embodiment, a computer-implemented method of monitoring device electrical usage within a property may be provided. The property may be populated with a hardware controller in communication with a plurality of devices. The computer-implemented method may include, with customer permission or consent, (1) retrieving, by the hardware controller, electrical usage data from a device disposed within the property, (2) analyzing, by one or more processors, the electrical usage data to determine that a parameter of the electrical usage data exceeds a threshold value, (3) generating, by the one or more processors, a command to modify operation of the device to address the electrical usage data, and/or (4) sending the command to the device, wherein the device executes the command to modify the operation of the device. The method may include additional, less, or alternate actions, including that discussed elsewhere herein, and/or may be implemented via (i) one or more local or remote processors (such via mobile devices, smart home controllers, and/or insurance provider remote servers), and/or (ii) computer-executable instructions stored on non-transitory computer-readable medium or media.

According to another embodiment, a hardware controller for monitoring device electrical usage within a property may be provided. The hardware controller may be in communication with a plurality of devices. The hardware controller may include a communication module adapted to retrieve electrical usage data from a device disposed within the property, a memory adapted to store non-transitory computer executable instructions, and a processor adapted to interface with the communication module and the memory. The processor may be configured to execute the non-transitory computer executable instructions to cause the processor to analyze the electrical usage data to determine that a parameter of the electrical usage data exceeds a threshold value, generate a command to modify operation of the device to address the electrical usage data, and/or send, via the communication module, the command to the device, wherein the device executes the command to modify the operation of the device. The hardware controller may include additional, less, or alternate functionality, including that discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the system and methods disclosed herein. It should be understood that each Figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

There are shown in the drawings arrangements which are presently discussed, it being understood, however, that the present embodiments are not limited to the precise arrangements and instrumentalities shown, wherein.

Figure 1:
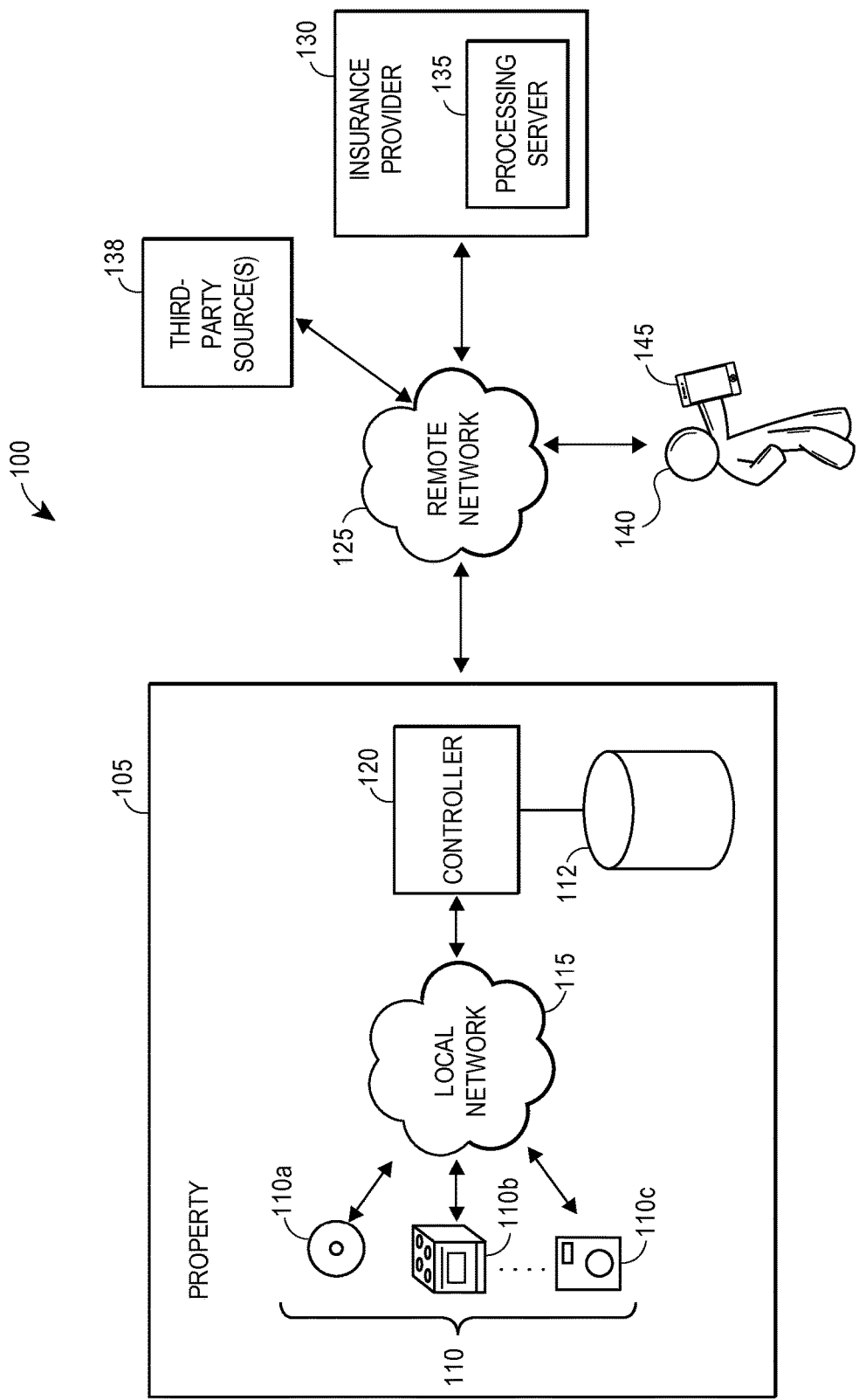
FIG. 1 depicts an exemplary environment including components and entities associated with managing device operation and facilitating insurance policy processing, in accordance with some embodiments.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The present embodiments may relate to, inter alia, managing operation of devices or personal property within a home or other type of property, such as household furniture, appliances, electronics, vehicles (e.g., cars, boats, motorcycles), and/or other personal belongings (e.g., clothing, jewelry, antiques). Generally, a home or property may have a "smart" central controller that may be wirelessly connected, or connected via hard-wire, with various household related items, devices, and/or sensors. The central controller may be associated with any type of property, such as homes, office buildings, restaurants, farms, and/or other types of properties.

The central controller, and/or one or more remote processors or servers associated with an insurance provider, may be in wireless or wired communication with various "smart" items or devices, such as smart appliances (e.g., clothes washer, dryer, dish washer, refrigerator, etc.); smart heating devices (e.g., furnace, space heater, etc.); smart cooling devices (e.g., air conditioning units, fans, ceiling fans, etc.); smart plumbing fixtures (e.g., toilets, showers, water heaters, piping, interior and yard sprinklers, etc.); smart cooking devices (e.g., stoves, ovens, grills, microwaves, etc.); smart wiring, lighting, and lamps; smart personal vehicles; smart thermostats; smart windows, doors, or garage doors; smart window blinds or shutters; and/or other smart devices and/or sensors capable of wireless or wired communication. Each smart device (or sensor associated therewith), as well as the central controller and/or insurance provider remote processor(s), may be equipped with a processor, memory unit, software applications, wireless transceivers, local power supply, various types of sensors, and/or other components.

The central controller, and/or the remote processor(s) of the insurance provider, may collect or retrieve various data from the devices or personal property, analyze the data, and/or identify various actions to facilitate based upon the analysis. In particular, the central controller and/or remote processor(s) may retrieve electrical usage data from the smart devices, where the electrical usage data indicates electrical usage patterns or consumption associated with the smart devices. The central controller and/or remote processor(s) may analyze the electrical usage data for the corresponding smart device, such as by comparing the electrical usage data to recommended usage amounts, operation limits, minimum effective amounts, and/or other metrics.

Based upon the analysis, the central controller and/or insurance provider remote processor(s) may determine one or more operations or actions that may be needed for the smart device. The central controller and/or insurance provider may also send an appropriate command to the smart device and/or to another component to cause the smart device to modify its operation to manage any detected issues. The central controller and/or insurance provider remote processor(s) may also communicate with a third-party entity as well as a user or mobile device of an individual associated with the property (e.g., an occupant or owner of the property). The third-party entity may be a manufacturer, supplier, servicer, or retailer of a replacement device and/or one or more of the smart devices. The individual may use the user device to access information associated with the determined action and/or with the replacement device and/or to purchase (and/or install) a replacement device.

The systems and methods discussed herein address a challenge that is particular to property management. In particular, the challenge relates to a difficulty in assessing or determining electrical usage associated with connected devices within a property, as well as a difficulty in handing or managing the electrical usage of the connected devices. This is particularly apparent when certain devices are used frequently or are nearing the end of their lifespan. In conventional circumstances, devices may fail or experience fault conditions without warning, which necessitates property owners to repair or replace the devices, and may also result in other property issues such as a power failure. In contrast, the systems and methods monitor connected device operation and analyze electrical usage data to dynamically assess the need to perform certain actions in the event of unusual electrical usage data patterns. Therefore, because the systems and methods employ the collection and analysis of electrical usage data associated with connected devices within a property, the systems and methods are necessarily rooted in computer technology in order to overcome the noted shortcomings that specifically arise in the realm of property management.

Similarly, the systems and methods provide improvements in a technical field, namely, home automation. Instead of the systems and methods merely being performed by hardware components using basic functions, the systems and methods employ complex steps that go beyond the mere concept of simply retrieving and combining data using a computer. In particular, the hardware components detect connected devices, receive electrical usage data from the connected devices, analyze the electrical usage data in combination with additional data to assess the need to perform certain actions, and facilitate the actions to manage operation of the devices. Additionally, because a central controller in a property retrieves and analyzes electrical usage data from a plurality of connected devices in the property, the central controller and the connected devices are part of a "thin client" environment that improves data persistence and information processing. This combination of elements further impose meaningful limits in that the operations are applied to improve home automation by detecting when certain actions need to be initiated, and facilitating the actions in a meaningful and effective way.

According to implementations, the systems and methods may support a dynamic, real-time or near-real-time analysis of any received electrical usage data. In particular, the central controller and/or insurance provider may retrieve and/or receive real-time electrical usage data from the smart devices, analyze the electrical usage data in real time, and/or dynamically determine an action or command to take based upon the analysis. Additionally, the central controller and/or insurance provider may provide, in real-time, the action or command to the smart device (and/or to another device) to perform the command to manage its operation. Accordingly, the real-time capability of the systems and methods enable the smart devices to dynamically modify their operation to manage any detected issues resulting from the analysis of the electrical usage data. Additionally, individuals associated with the property are afforded the benefit of being dynamically notified of the issues so that the individuals may take any proper mitigating actions.

Generally, the systems and methods offer numerous benefits to operation of devices within the property, as well as to individuals associated with the property. In particular, the systems and methods may automatically detect potential or actual issues with the property that the individuals may not realize exist, and/or may automatically facilitate preventative or corrective actions to address the issues. As a result, security associated with the property may improve. Further, the systems and methods improve loss prevention and mitigate actual loss. Additionally, the systems and methods may improve energy consumption. As a further benefit, individuals associated with the property may be able to preemptively purchase replacement devices for smart devices that may be nearing failure or other defect issues.

The systems and methods may further offer a benefit to insurance providers and customers thereof. Particularly, the present embodiments may facilitate (a) providing and updating insurance policies; (b) the handling or adjusting of home insurance claims; (c) the disbursement of monies related to insurance claims; (d) modifying insurance coverage amounts; (e) updating and improving damage estimate models; and/or (f) other insurance-related activities. The systems and methods may further offer a benefit to customers by offering improved insurance claim processing. Further, the insurance providers may stand out as a cost-effective insurance provider, thereby retaining existing customers and attracting new customers. It should be appreciated that further benefits to the systems and methods are envisioned.

The method may also include adjusting an insurance policy, premium, or discount (such as a homeowners, renters, auto, home, health, or life insurance policy, premium, or discount) based upon the functionality discussed herein, and/or an insured having a home and/or mobile device with such functionality.

I. Exemplary Environment and Components for Assessing Device Operation and Functionalities Relating Thereto FIG. 1 depicts an exemplary environment 100 including components and entities for managing devices associated with a property and processing insurance policies associated therewith. Although FIG. 1 depicts certain entities, components, and devices, it should be appreciated that additional, fewer, or alternate entities and components are envisioned.

As illustrated in FIG. 1, the environment 100 may include a property 105 that contains a controller 120 and a plurality of devices 110 (or smart devices) that may be each connected to a local communication network 115. Each of the plurality of devices 110 may be a "smart" device that may be configured with one or more sensors capable of sensing and communicating operating data associated with the corresponding device 110. As shown in FIG. 1, the plurality of devices 110 may include a smart alarm system 110a, a smart stove 110b, and/or a smart washing machine 110c. Each of the plurality of devices 110 may be located within or proximate to the property 105 (generally, "on premises"). Although FIG. 1 depicts only one property 105, it should be appreciated that multiple properties are envisioned, each with its own controller and devices. Further, it should be appreciated that additional, fewer, or alternate devices may be present in the property 105.

In some cases, the plurality of devices 110 may be purchased from a manufacturer with the "smart" functionally incorporated therein. In other cases, the plurality of devices 110 may have been purchased as "dumb" devices and subsequently modified to add the "smart" functionality to the device. For instance, a homeowner may purchase an alarm system that installs sensors on or near a door to detect when a door has been opened and/or unlocked.

In some embodiments, the plurality of devices 110 may monitor their own status or condition via the sensors to detect any issues or problems. In response to detecting issues or problems, the plurality of devices 110 may be able to indicate the issues or problems via display components, such as LED lights, display screens, or other visual indicators. In further embodiments, the controller 120 may be configured to monitor, via sensor data, whether the plurality of devices 110 and/or parts thereof have been installed correctly, whether replacement parts are new and/or otherwise in good condition, and/or other conditions associated with the plurality of devices 110 and/or parts thereof.

The plurality of devices 110 may be configured to communicate with a controller 120 via the local communication network 115. The local communication network 115 may facilitate any type of data communication between devices and controllers located on or proximate to the property 105 via any standard or technology (e.g., LAN, WLAN, any IEEE 802 standard including Ethernet, and/or others). The local communication network 115 may further support various short-range communication protocols, such as Bluetooth®, Bluetooth® Low Energy, near field communication (NFC), radio-frequency identification (RFID), and/or other types of short-range protocols.

According to aspects, the plurality of devices 110 may transmit, to the controller 120 via the local communication network 115 (and/or to the insurance provider 130 remote processing server 135 via the network 125), operational data gathered from sensors associated with the plurality of devices 110. The operational data may be audio data, image or video data, status data, usage amounts, and/or other data or information. For instance, the operational data may indicate that a window has been shattered; the presence of a person, fire, or water in a room; the sound made near a smart device; and/or other information pertinent to an operation state or status of the plurality of devices 110. For further instance, the operational data may include motion data that may indicate whether any individuals are within the property 105 (i.e., whether the property 105 is occupied or unoccupied). Additionally, the operational data may include device usage data. The operational data may include a timestamp representing the time that the operational data was recorded.

In some cases, the plurality of devices 110 may transmit, to the controller 120 (and/or insurance provider 130 remote processing server 135), various data and information associated with the plurality of devices 110. In particular, the data and information may include location data within the property, as well as various costs and prices associated with the plurality of devices 110. For instance, a washing machine may include a component such as a data tag that stores a location of the washing machine within the property 105, a retail price of the washing machine, and/or replacement costs of various parts of (or the entirety of) the washing machine. The various data and information may be programmable and updatable by an individual or automatically by the controller 120.

The controller 120 may be coupled to a database 112 that stores various operational data and information associated with the plurality of devices 110. Although FIG. 1 depicts the database 112 as coupled to the controller 120, it is envisioned that the database 112 may be maintained in the "cloud" such that any element of the environment 100 capable of communicating over either the local network 115 or one or more other networks 125 may directly interact with the database 112.

In some embodiments, the database 112 may organize the operational data according to which individual device 110 the data may be associated and/or the room or subsection of the property in which the data was recorded. Further, the database 112 may maintain an inventory list that includes the plurality of devices 110, as well as various data and information associated with the plurality of devices 110 (e.g., locations, replacement costs, etc.).

In one embodiment, the database 112 may maintain various operation states of the plurality of devices 110. In particular, the operation states may specify various settings of the plurality of devices 110 such that when the respective device is configured at the setting(s), the respective device will operate in the corresponding operation state. For instance, an operation state for a smart thermostat may be "heat conservation" whereby the corresponding setting is 64 degrees (as opposed to a more "normal" 70 degree setting). It should be appreciated that each operation state may specify settings for more than one of the devices 110.

The controller 120 (and/or the plurality of devices 112) may be configured to communicate with other components and entities, such as an insurance provider 130 and various third party source(s) 138 via the network(s) 125. According to some embodiments, the network(s) 125 may facilitate any data communication between the controller 120 located on the property 105 and entities or individuals remote to the property 105 via any standard or technology (e.g., GSM, CDMA, TDMA, WCDMA, LTE, EDGE, OFDM, GPRS, EV-DO, UWB, IEEE 802 including Ethernet, WiMAX, Wi-Fi, and/or others). In some cases, both the local network 115 and the network 125(s) may utilize the same technology.

Generally, the insurance provider 130 may be any individual, group of individuals, company, corporation, or other type of entity that may issue insurance policies for customers, such as a home insurance policy associated with the property 105. According to the present embodiments, the insurance provider 130 may include one or more processing server(s) 135 configured to facilitate the functionalities as discussed herein. Although FIG. 1 depicts the processing server 135 as a part of the insurance provider 130, it should be appreciated that the processing server 135 may be separate from (and connected to or accessible by) the insurance provider 130.

Further, although the present disclosure describes the systems and methods as being facilitated in part by the insurance provider 130, it should be appreciated that other non-insurance related entities may implement the systems and methods. For instance, a general contractor may aggregate the insurance-risk data across many properties to determine which appliances or products provide the best protection against specific causes of loss, and/or deploy the appliances or products based upon where causes of loss are most likely to occur. Accordingly, it may not be necessary for the property 105 to have an associated insurance policy for the property owners to enjoy the benefits of the systems and methods.

The third-party source(s) 138 may represent any entity or component that is configured to obtain, detect, and/or determine data or information that may be relevant to the devices 110 of the property 105. In some embodiments, the third-party source(s) 138 may be a manufacturer, supplier, servicer, or retailer of the any of the devices 110, as well as for replacement devices for the devices 110. For instance, if one of the devices 110 is a refrigerator, the third-party source 138 may be refrigerator manufacturer that sells refrigerators of the same or different types or models as the refrigerator device 110. The third-party source(s) 138 may store data associated with a replacement device (e.g., cost, retail location, general information, availability, or the like). The third-party source(s) 138 may be configured to communicate various data or information to the controller 120 and/or to the insurance provider 130 via the network(s) 125, whereby the controller 120 and/or the insurance provider 130 may examine the data or information to facilitate various functionalities.

The controller 120, the insurance provider 130, and/or the processing server 135, and the third-party source(s) 138 may also be in communication, via the network(s) 125, with an electronic device 145 associated with an individual 140. In some embodiments, the individual 140 may have an insurance policy (e.g., a home insurance policy) for the property 105 or a portion of the property 105, or may otherwise be associated with the property 105 (e.g., the individual 140 may live in the property 105). The electronic device 145 may be a mobile device, such as a smartphone, a desktop computer, a laptop, a tablet, a phablet, a smart watch, smart glasses, wearable electronics, pager, personal digital assistant, or any other electronic device, including computing devices configured for wireless radio frequency (RF) communication and data transmission. In some implementations, the controller 120 (and/or insurance provider 130 remote processing server 135) may communicate, to the individual 140 via the electronic device 145, an indication of the operation of the plurality of devices 110, such as the commands transmitted to the plurality of devices 110. Further, the controller 120 (and/or insurance provider 130 remote processing server 135) may enable the individual 140 to remotely control various of the plurality of devices 110 via the electronic device 145.

According to some other implementations, the controller 120 (and/or insurance provider 130 remote processing server 135) may detect damage to any of the plurality of devices 110 and/or to other portions of the property 105. The controller 120 (and/or insurance provider 130 remote processing server 135) may generate notifications or alerts associated with the detected damage, and/or communicate the notifications or alerts to the electronic device 145 via the network 125. Further, the controller 120 (and/or insurance provider 130 remote processing server 135) may also generate a proposed insurance claim that indicates the damage and transmit, via the network 125, the proposed insurance claim related to the electronic device 145. The proposed insurance claim may contain pre-populated fields that indicate various information and data, such as causes of loss (e.g., water, wind, fire, etc.); damaged devices; costs associated with the damaged devices; time, date, and/or location of the insurance-related event; and/or other information included in an insurance claim.

The controller 120 (and/or insurance provider 130 remote processing server 135) may also transmit any modifications to insurance policies based upon detected data from the plurality of devices 110. In response, the homeowner 140 may accept the proposed insurance claim or make modifications to the proposed insurance claim, and/or otherwise accept/reject any modifications to the insurance policy. The electronic device may transmit, via the network 125, the accepted or modified insurance claim back to the controller 120 (and/or insurance provider 130 remote processing server 135).

The controller 120 may facilitate any processing of the insurance claim with the processing server 135 of the insurance provider 130. Additionally or alternatively, the processing server 135 may facilitate the proposed insurance claim communications and processing directly with the customer 140. In some implementations, the insurance provider 130 remote processing server 135 may provide the same functionality as that described herein with respect to the controller 120.

The controller 120, and/or the insurance provider 130 remote processing server 135, may also assess usage of various of the devices 110, and/or may notify individuals of potential concerns, lack of usage, and/or other information. In particular, the controller 120, and/or the insurance provider 130 remote processing server 135, may gather various data from the devices 110, and determine that there may be an issue or concern with one or more of the devices 110. The issue or concern may have a risk of, in some circumstances, leading to a loss or damage to the property 105, or breakdown or malfunctioning of the corresponding device 110. For instance, usage data associated with a water heater may indicate that the water heater is nearing its recommended lifetime usage amount. For further instance, the usage data may include electrical load data associated with electricity consumption by a piece of equipment, where the electrical load data may indicate that the piece of equipment is nearing an end of its useful life or should be replaced. As an additional example, the usage data may include audio data associated with a running or operating piece of equipment (e.g., sound of a pump, motor, dish washer, clothes washer or dryer, air conditioning unit, refrigerator, furnace, sump pump or sump pump motor, etc.). The audio data may indicate that the piece of equipment is nearing an end of its useful life or should be replaced.

The insurance provider 130 remote processing server 135, may generate a corresponding alert or notification, and send the alert or notification to the individual, such as via wireless communication to their mobile device. For further instance, the controller 120, and/or the insurance provider 130 remote processing server 135, may detect that a circuit breaker or a ground fault circuit interrupter (GFCI) is tripped, and/or generate a corresponding notification. Further, for instance, the controller 120, and/or the insurance provider 130 remote processing server 135, may monitor the ages of the devices 110 to determine when one of the devices 110 may need to be replaced.

Figure 2:
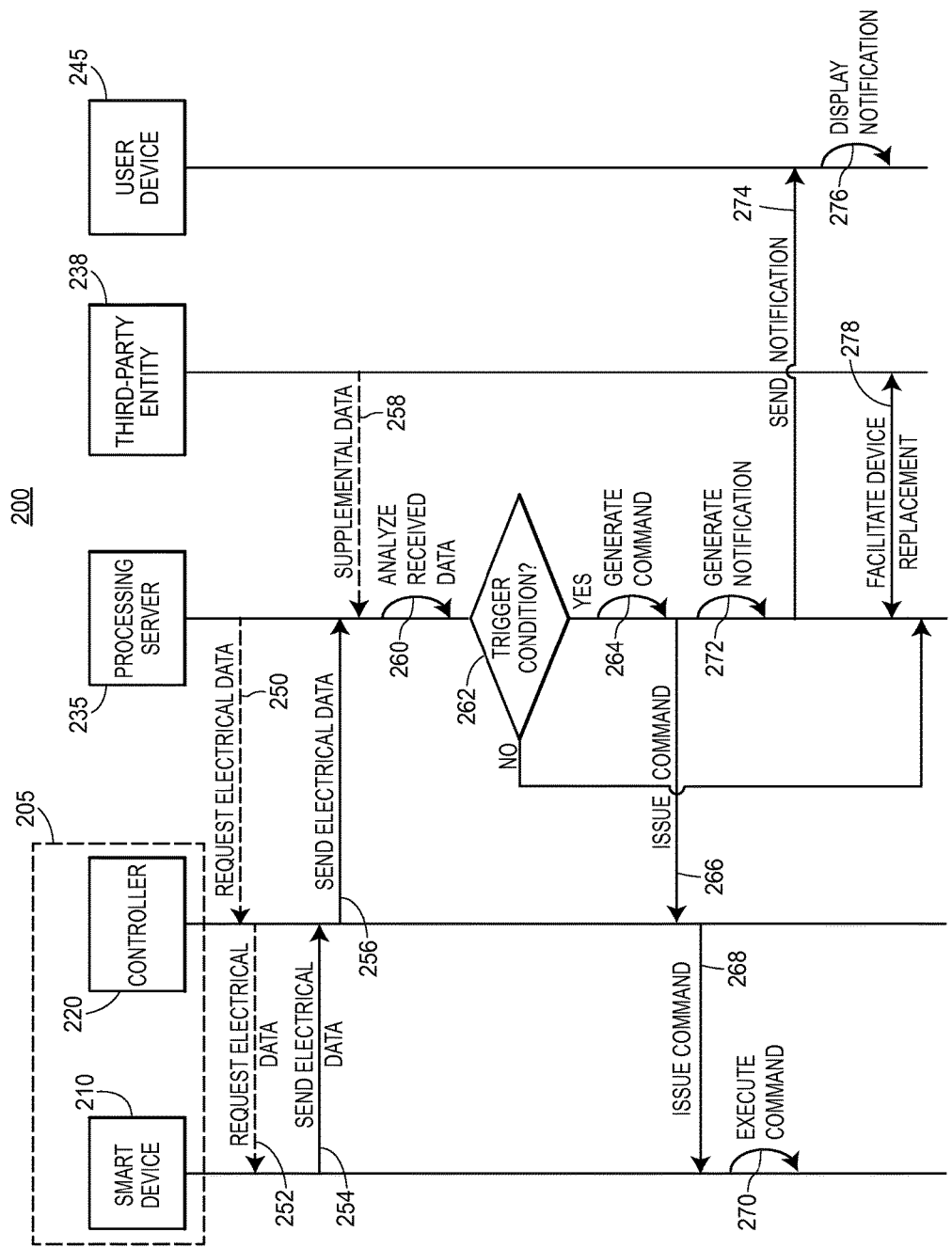
FIG. 2 is an exemplary signal diagram associated with monitoring device electrical usage within a property and facilitating various actions, in accordance with some embodiments.

II. Exemplary Communication Flow for Assessing Device Electrical Usage Data and Facilitating Corresponding Actions Referring to FIG. 2, illustrated is an exemplary signal diagram 200 associated with collecting smart device electrical usage data and facilitating various functionalities relating thereto. FIG. 2 may include a smart device 210 (such as one of the smart devices 110 (or one of the plurality of devices) as discussed with respect to FIG. 1), a controller 220 (such as the controller 120 as discussed with respect to FIG. 1), a processing server 235 (such as the processing server 135 as discussed with respect to FIG. 1), one or more third-party entities 238 (such as the third-party entity 138 as discussed with respect to FIG. 1), and/or a user device 245 (such as the user device 145 as discussed with respect to FIG. 1).

The smart device 210 and the controller 220 may be located within a property 205 (such as the property 105 as discussed with respect to FIG. 1). According to some embodiments, the user device 245 may belong to an individual associated with the property 205, such as a resident of the property 205 and/or an individual having an insurance policy for the property 205. The third-party entity 238 may be any entity, such as manufacturer, retailer, and/or servicer, that may provide relevant data, facilitate the replacement of smart devices, and/or facilitate other functionalities.

The signal diagram 200 may begin when the processing server 235 optionally requests (250) the controller 220 for electrical usage data associated with the smart device 210. The controller 220 may relay (252) the request for electrical usage data to the smart device 210 via a network connection within the property 205. The request may specify various parameters, such as electrical usage data for a specific part or portion of the smart device 210 (e.g., the output power), as well as electrical usage data for a particular time period (e.g., month-by-month usage data, year-to-date electrical usage data) or electrical usage data for the lifetime of the smart device 210. The request may also request the smart device 210 to provide instances of electrical-related faults or errors, and/or timestamps thereof. The smart device 210 may send (254) its electrical usage data and any data relating thereto to the controller 220 via the network connection. It should be appreciated that the smart device 210 may send its electrical usage data automatically as a result of certain triggers (e.g., an electrical usage amount threshold or at a set time(s)), or in response to the request from the processing serve 235.

After receiving the electrical usage data from the smart device 210, the controller 220 may send (256) the electrical usage data to the processing server 235. In an optional implementation, the processing server 235 may receive (258) supplemental data from the third-party entity 238. In implementations, the supplemental data may be in the form of weather data associated with a vicinity of the property, supplemental information about the smart device 210 (e.g., recommended electrical usage parameters), and/or other data. The processing server 235 may analyze (260) the electrical usage data and optionally the supplemental data. In particular, the processing server 235 may determine, from the electrical usage data and optionally the supplemental data, whether any actions need to be taken to manage operation of the smart device 210 (i.e., whether a trigger condition exists), such as by comparing the electrical usage data to various threshold or baseline metrics.

For example, the processing server 235 may determine that a power output of a refrigerator over a 1-hour period exceeds a recommended threshold level. For further example, the processing server 235 may determine that a washing machine experienced a power surge. As an additional example, the processing server 235 may determine that a power output of a set of lights in a room exceeds a recommended amount for a particular time of day (e.g., between 11:00 AM and 1:00 PM), which the processing server 235 may determine from the supplemental data. It should be appreciated that alternative and/or additional types of analyses associated with the electrical usage data are envisioned.

The processing server 235 may determine (262) whether a trigger condition is met, based upon the analysis of (260). If a trigger condition is not met ("NO"), processing may end or proceed to other functionality. If a trigger condition is met ("YES"), the processing server 235 may generate (264) a command that may be associated with the trigger condition. In implementations, the command may be intended to mitigate any situation, circumstance, and/or the like indicated in the electrical usage data. For example, if the electrical usage data indicates that the smart device 210 is outputting too much power, the command may be intended to reduce the power output of the smart device 210. For further example, if the electrical usage data indicates that the smart device 210 is not receiving any power, the command may be intended to re-route the power supply from a first power supply (e.g., main power) to a second power supply (e.g., a generator).

The processing server 235 may issue (266) or send the command to the controller 220, and the controller may issue (268) or send the command to the smart device 210. After receiving the command, the smart device 210 may execute (270) the command to cause the smart device 210 to modify its operation. In some implementations, another device other than the smart device 210 (such as another smart device or component) may execute the command to modify operation of the smart device 210. For example, the smart device 210 may execute the command to reduce its power output according to a set schedule. For further example, the smart device 210 may execute the command to cease operation. It should be appreciated that other types of commands are envisioned.

The processing server 235 may further generate (272) a notification that indicates the issued command, a portion or all of the electrical usage data, any detected operating parameters associated with the smart device 210, and/or other information. The processing server 235 may also send (274) the notification to the user device 245 and the user device 245 may display (276) or indicate the notification. In this regard, the user of the user device 245 may effectively and efficiently assess any situation associated with the smart device 210 and/or with the property.

In some implementations, the processing server 235 may determine if a replacement device for the smart device 210 is needed. For example, a replacement device may be needed if the actual electrical usage amount exceeds a certain threshold. If the processing server 235 determines that a replacement device is needed ("YES"), then the processing server 235 may facilitate (278) a device replacement with the third-party entity 238 and/or with a user of the user device 245. In particular, the processing server 235 may retrieve replacement device information from the third-party entity 238. In particular, the replacement device information may include information associated with replacing the smart device 210 including, for example, an indication of a replacement device, images of the replacement device, cost information, delivery/pickup information, installation information, and/or other information.

The processing server 235 may provide the replacement device information to the user device 245 for review by the individual. In particular, the individual may view the replacement device information as well as any usage information associated with the smart device 210, and assess whether to purchase a replacement device for the smart device 210. If the individual decides to purchase the replacement device, the individual may use the user device 245 to request a purchase of the replacement device. According to embodiments, the user device 245 may send the request to the processing server 235 or to the third-party entity 238.

The processing server 235, the third-party entity 238, and/or the user device 245 may facilitate a purchase of the replacement device. In one implementation, the user device 235 may submit an order for the replacement device with the third-party entity 238 via an e-commerce platform. The order for the replacement device may have an associated delivery or pickup date. It should be appreciated that additional implementations for facilitating the purchase (and/or installation) of the replacement device are envisioned. Further, although not shown in FIG. 2, it should be appreciated that the processing server 235 may process an insurance policy associated with the property 205 based upon the electrical data and the analysis thereof.

Although FIG. 2 depicts the processing server 235 performing various steps and determinations, it should be appreciated that the controller 220 may perform the same or similar steps or determinations. For example, the controller 220 may request the electrical usage data, perform any analyses on the electrical usage data, generate and issue commands, communicate associated information to the user device 245, and/or facilitate the purchase of the replacement device.

Figure 3:
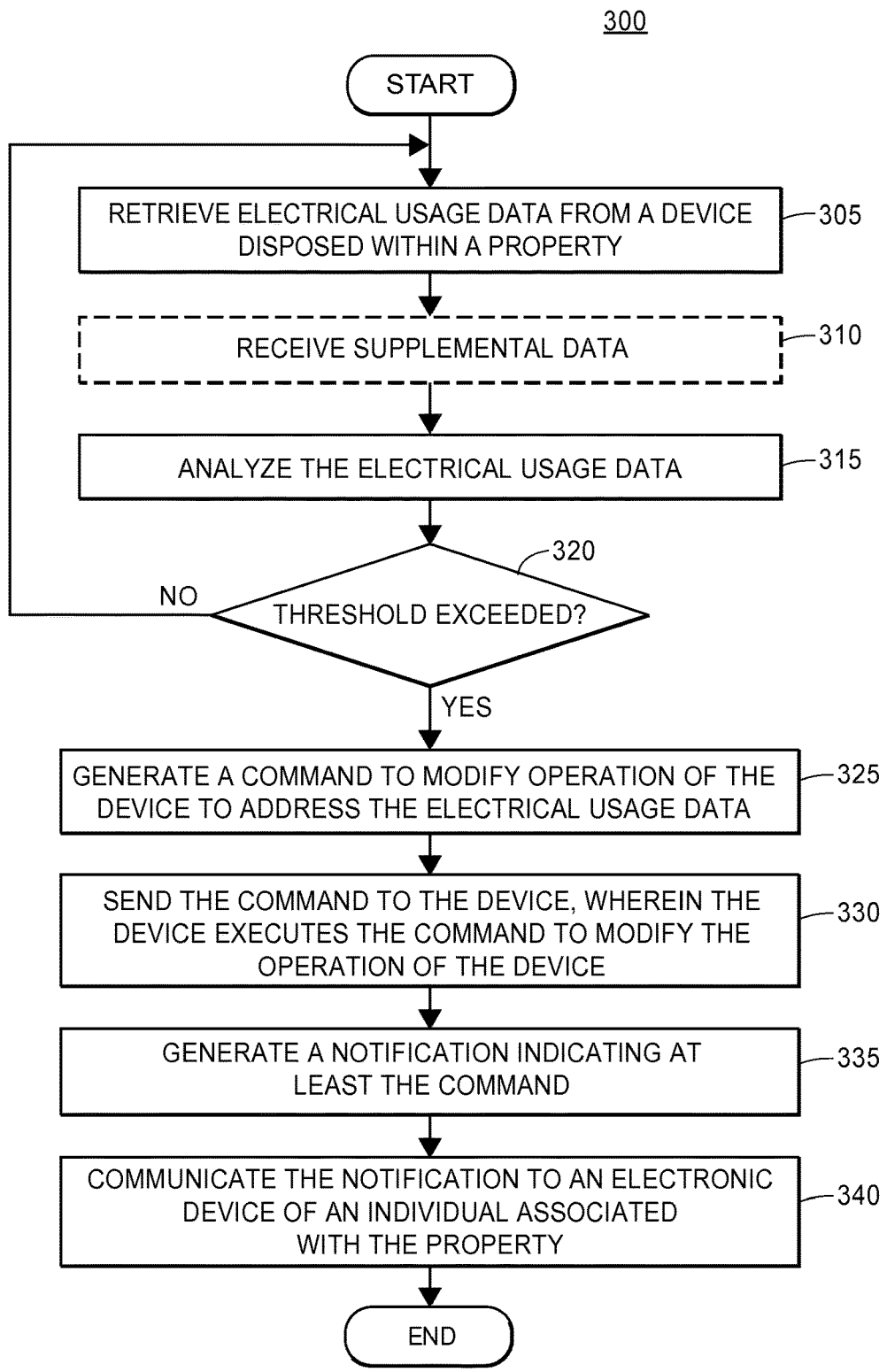
FIG. 3 is a flow diagram of an exemplary computer-implemented method of monitoring device electrical usage within a property, in accordance with some embodiments.

III. Exemplary Method for Assessing Electrical Usage Data and Facilitating Appropriate Actions Referring to FIG. 3, depicted is a block diagram of an exemplary method 300 of monitoring device electrical usage within a property. The method 300 may be facilitated by an electronic device within the property such as the controller 120, that may be in direct or indirect communication with an insurance provider (such as the insurance provider 130 or a remote processor or server thereof), or a third-party entity such as a manufacturer, supplier, servicer, and/or retailer of one or more of the devices 110, or a general third-party data source. In some implementations, the method 300 may be facilitated by a remote entity (in whole or in part) such as an insurance provider (such as the insurance provider 130).

The controller 120, and/or the insurance provider 130 remote processing server 135, may also monitor usages of the devices 110. The controller 120, and/or the insurance provider 130 remote processing server 135 may detect when one of the devices 110 has an increased usage such as a usage spike, and may notify any pertinent individuals of the increased usage.

The method 300 may begin when the controller retrieves (block 305) electrical usage data from a device disposed within a property, such as one of the devices 110. In some embodiments, the electrical usage data may include any metrics associated with power or electrical consumption or usage in connection with operation of the device. For example, the electrical usage data may indicate power output for the specific device. The electrical usage data may also indicate an associated time period. For example, the electrical usage data may include a chart of the relevant data over a specified time period (e.g., week, month, year, or lifetime). Accordingly, the controller may request certain electrical usage metrics from the device for one or more specific time periods, and the device may send the requested electrical usage data to the controller.

The controller may optionally receive (block 310) supplemental data from a remote server. According to embodiments, the supplemental data may indicate certain current conditions that may impact or otherwise affect any analysis of the electrical usage data. For example, the supplemental data may indicate weather conditions in a vicinity of the property. For further example, the supplemental data may include certain operating parameters associated with the device, such as recommended electrical usage levels for normal operation, lifetime operation, and/or the like.

The controller may analyze (block 315) the electrical usage data and optionally the supplemental data to determine whether any actions need to be taken in connection with the device. In particular, the controller may compare any parameters or metrics associated with the electrical usage data to one or more thresholds. For example, the controller may determine that a maximum power output of the device exceeds a threshold level associated with a potential power fault. For further example, the controller may determine that a lifetime power output of the device exceeds a threshold level associated with a recommended lifetime usage of the device. In some implementations, the controller may account for the supplemental data in the analysis, whereby the supplemental usage data may impact certain threshold values or levels. For example, the controller may adjust a maximum output power threshold in the event of a severe storm in the area, as indicated in the supplemental data. It should be appreciated that other analyses and other threshold determinations are envisioned.

The controller may determine (block 320) whether a threshold is exceeded as a result of the analysis of block 315. If a threshold is not exceeded ("NO"), processing may return to block 305 or proceed to other functionality. If a threshold is exceeded ("YES"), the controller may generate (block 325) a command to modify operation of the device to address the electrical usage data. In some implementations, the command may be related to ceasing operation of the device (i.e., a shutdown command), such as if the electrical usage data exceeds a threshold usage limit. In other implementations, the command may be related to causing the device to indicate a certain condition, such as via a visual indication that may be noticed by an individual. In additional implementations, the command may be related to a re-routing of power to the device from a first power supply (e.g., main power) to a second power supply (e.g., a generator).

The controller may send (block 330) the command to the device, wherein the device may execute the command to modify the operation of the device. Upon receiving the command, the device may execute the command. For example, the device may execute a shutdown routine, may cause a certain visual indication to activate, may adjust operation to reduce its power output, or may switch power supplies. The controller may also generate (block 335) a notification that indicates at least the command. In particular, the notification may include a description of the command, a status of the command (e.g., whether the device has executed the command, a time of execution), a result of executing the command (e.g., a refrigerator is powered down), and/or other relevant information. The notification may, in some embodiments, indicate a replacement device for the device, such as in cases in which the device has failed or is near failure.

The controller may communicate (block 340) the notification to an electronic device of an individual associated with the property. In this regard, the individual may view the notification to be notified of the situation and to take any appropriate action. In some implementations, the controller may enable the individual to remotely control the device, such as by inputting operating parameters or commands to send to the device. In another implementation, the individual may use the electronic device to research, request, and/or purchase a replacement device for the device, and/or arrange a time for installation of the replacement device.

IV. Exemplary Controller

Figure 4:
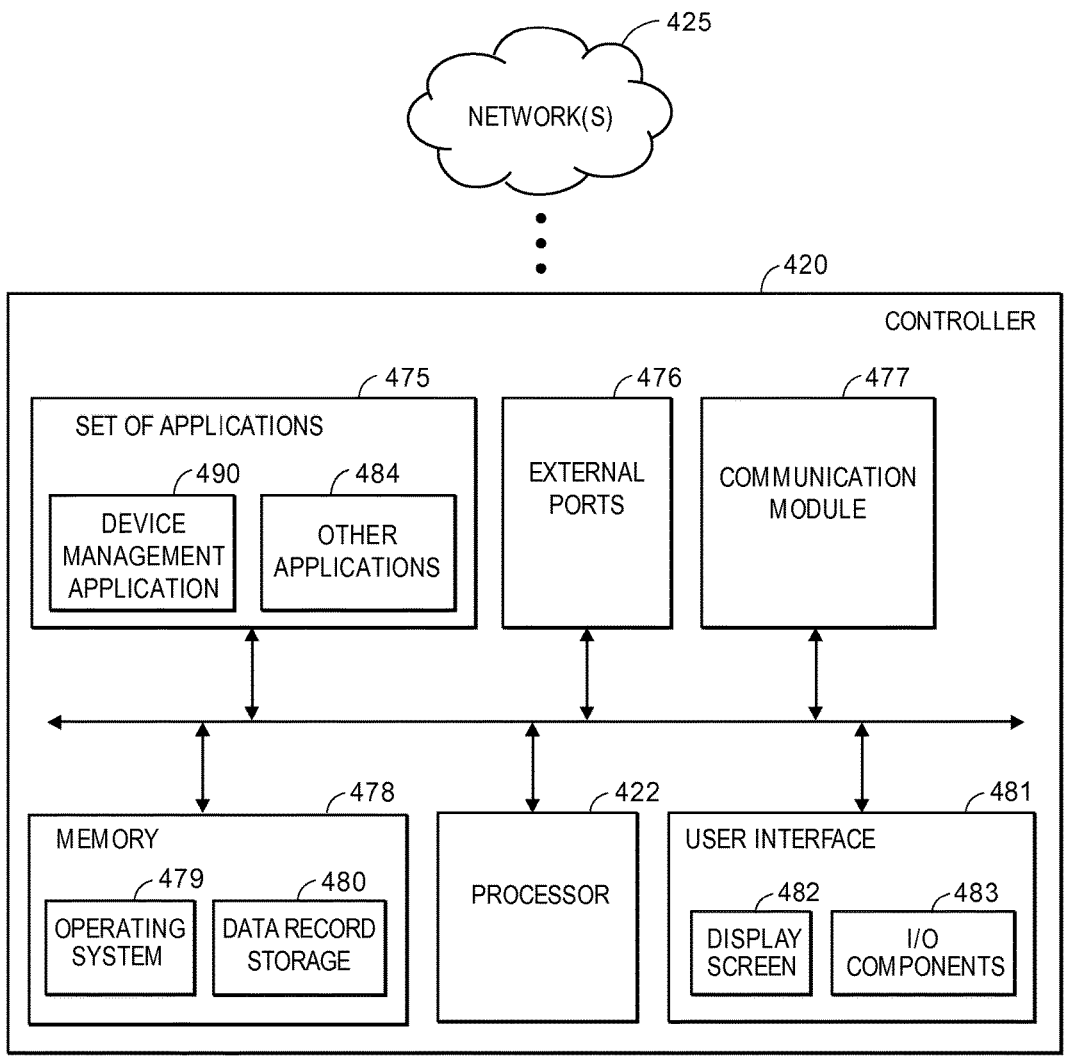
FIG. 4 is a block diagram of an exemplary controller in accordance with some embodiments.

FIG. 4 illustrates a diagram of an exemplary controller 420 (such as the controller 120 discussed with respect to FIG. 1) in which the functionalities as discussed herein may be implemented. It should be appreciated that the controller 420 may be associated with a property, as discussed herein.

The controller 420 may include a processor 422, as well as a memory 478. The memory 478 may store an operating system 479 capable of facilitating the functionalities as discussed herein, as well as a set of applications 475 (i.e., machine readable instructions). For instance, one of the set of applications 475 may be a policy processing application 484 configured to access and process customer insurance policies, and another of the set of applications 475 may be a device management application 490 configured to manage operation of smart devices according to an analysis of electrical usage data. It should be appreciated that other applications are envisioned.

The processor 422 may interface with the memory 478 to execute the operating system 479 and the set of applications 475. According to some embodiments, the memory 478 may also include a data record storage 480 that stores various data and information associated with devices and insurance policies. The policy processing application 484 and the device management application 490 may interface with the data record storage 480 to retrieve relevant information that the policy processing application 484 and the device management application 490 may use to manage insurance policies, generate proposed insurance claims, generate executable commands, generate notifications, facilitate a purchase (and/or installation) of a replacement device, and/or perform other functionalities. The memory 478 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The controller 420 may further include a communication module 477 configured to communicate data via one or more networks 425. According to some embodiments, the communication module 477 may include one or more transceivers (e.g., WWAN, WLAN, and/or WPAN transceivers) functioning in accordance with IEEE standards, 3GPP standards, or other standards, and/or configured to receive and transmit data via one or more external ports 476. Further, the communication module 477 may include a short-range network component (e.g., an RFID reader) configured for short-range network communications. For instance, the communication module 477 may receive, via the network 425, usage data from a plurality of devices populated within a property.

The controller 420 may further include a user interface 481 configured to present information to a user and/or receive inputs from the user. As shown in FIG. 4, the user interface 481 may include a display screen 482 and I/O components 483 (e.g., ports, capacitive or resistive touch sensitive input panels, keys, buttons, lights, LEDs, speakers, microphones). According to some embodiments, the user may access the controller 420 via the user interface 481 to process insurance policies and/or perform other functions. The controller 420 may be configured to perform insurance-related functions, such as generating proposed insurance claims and facilitating insurance claim processing. In some embodiments, the controller 420 may perform the functionalities as discussed herein as part of a "cloud" network or may otherwise communicate with other hardware or software components within the cloud to send, retrieve, and/or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 422 (e.g., working in connection with the operating system 479) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

V. Exemplary Server

Figure 5:
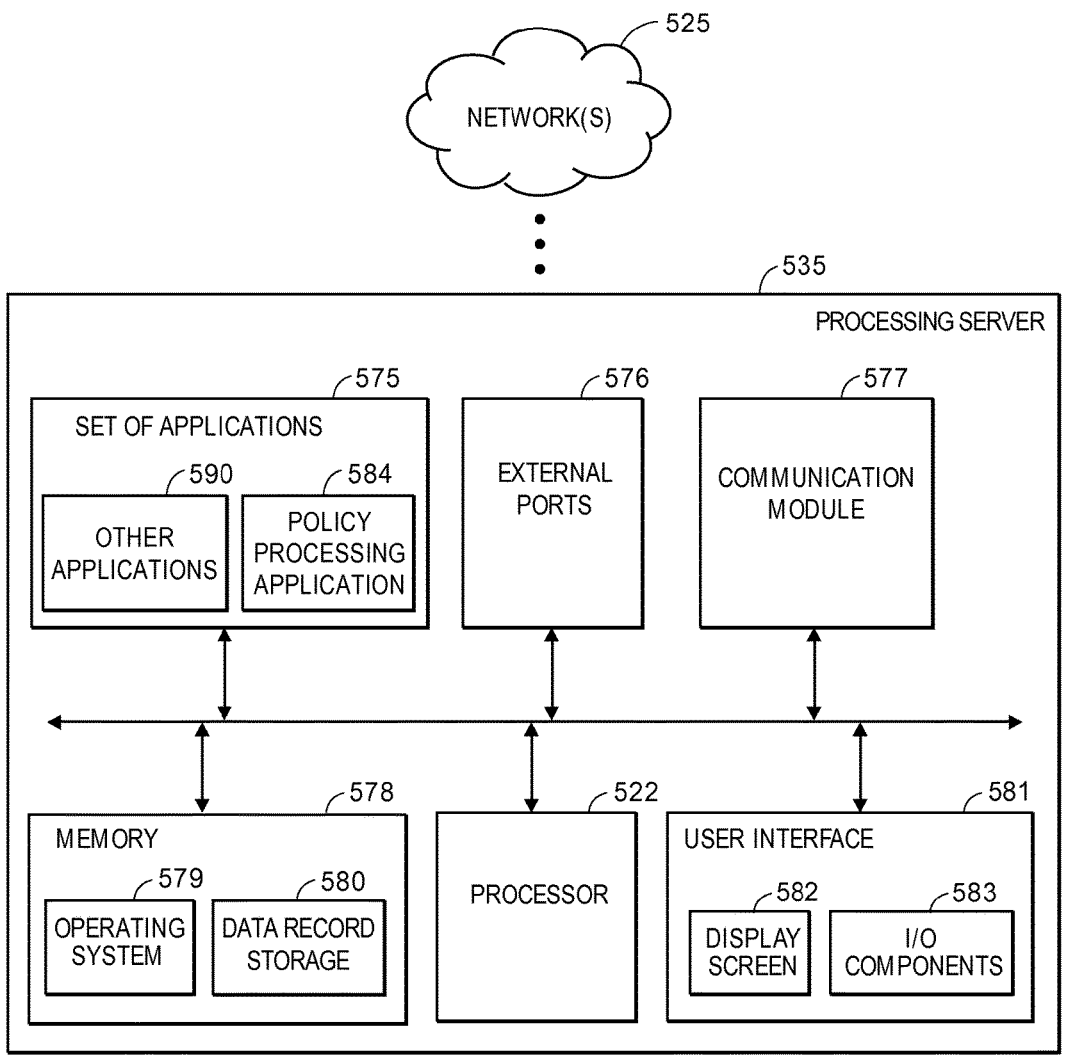
FIG. 5 is a block diagram of an exemplary processing server in accordance with some embodiments.

FIG. 5 illustrates a diagram of an exemplary processing server 535 (such as the processing server 135 discussed with respect to FIG. 1) in which the functionalities as discussed herein may be implemented. It should be appreciated that the processing server 535 may be associated with an insurance provider, as discussed herein. In one embodiment, the processing server may be configured with the same functionality as that of the controllers 120, 220 of FIGS. 1 and 2, respectively.

The processing server 535 may include a processor 522, as well as a memory 578. The memory 578 may store an operating system 579 capable of facilitating the functionalities as discussed herein, as well as a set of applications 575 (i.e., machine readable instructions). For instance, one of the set of applications 575 may be a policy processing application 584 configured to manage customer insurance policies. It should be appreciated that other applications 590 are envisioned, such as a device management application configured to facilitate the management of a smart device according to electrical usage data.

The processor 522 may interface with the memory 578 to execute the operating system 579 and the set of applications 575. According to some embodiments, the memory 578 may also include a data record storage 580 that stores various information associated with customer insurance policies. The policy processing application 584 may interface with the data record storage 580 to retrieve relevant information that the policy processing application 584 may use to manage insurance policies, generate notifications, and/or perform other functionalities. Further, the device management application may interface with the data record storage 580 to retrieve device information. The memory 578 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The processing server 535 may further include a communication module 577 configured to communicate data via one or more networks 525. According to some embodiments, the communication module 577 may include one or more transceivers (e.g., WWAN, WLAN, and/or WPAN transceivers) functioning in accordance with IEEE standards, 3GPP standards, or other standards, and configured to receive and transmit data via one or more external ports 576. For instance, the communication module 577 may receive, via the network 525, information associated with a replacement device for a device populated within a property.

The processing server 525 may further include a user interface 581 configured to present information to a user and/or receive inputs from the user. As shown in FIG. 5, the user interface 581 may include a display screen 582 and I/O components 583 (e.g., ports, capacitive or resistive touch sensitive input panels, keys, buttons, lights, LEDs, speakers, microphones). According to some embodiments, the user may access the processing server 535 via the user interface 581 to process insurance policies and/or perform other functions. In some embodiments, the processing server 535 may perform the functionalities as discussed herein as part of a "cloud" network or may otherwise communicate with other hardware or software components within the cloud to send, retrieve, and/or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 522 (e.g., working in connection with the operating system 579) to facilitate the functions as described herein. In this regard, the program code may be implemented in any desired language, and/or may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

VI. Exemplary User Interfaces for Facilitating Device Operation

Figures 6A, 6B:
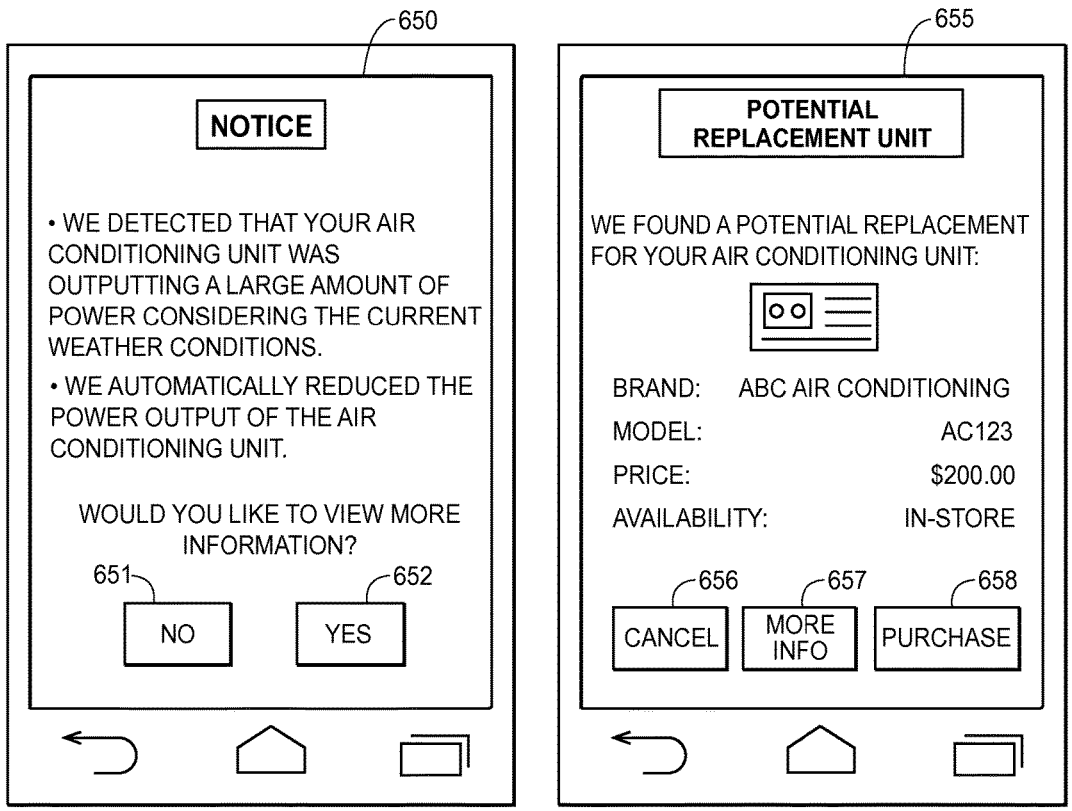
FIGS. 6A and 6B depict exemplary interfaces associated with notifying of device electrical usage, in accordance with some embodiments.

FIGS. 6A and 6B illustrate exemplary interfaces associated with example commands, displays, and actions for smart devices. An electronic device (e.g., a mobile device, such as a smartphone) may be configured to display the interfaces and/or receive selections and inputs via the interfaces. For example, a dedicated application associated with an insurance provider (or with a controller) and that is configured to operate on the electronic device may display the interfaces. It should be appreciated that the interfaces are merely examples and that alternative or additional content is envisioned.

FIG. 6A illustrates an interface 650 including details relating to a notice of device electrical usage. In particular, the interface 650 may include information resulting from an analysis of electrical usage data of an air conditioning unit. The interface 650 may indicate that the air conditioning unit was outputting a large amount of power (e.g., as compared to a threshold value), especially considering the current weather conditions (e.g., an outside temperature that may not necessitate having the air conditioning unit operate). The interface 650 may further indicate that the power output of the air conditioning unit was automatically reduced. The interface 650 may further enable a user of the electronic device to select whether to view more information via a "NO" selection 651 and a "YES" selection 652.

FIG. 6B illustrates an interface 655 that includes additional information associated with the air conditioning unit. In particular, the interface 655 includes information associated with a potential replacement air conditioning unit. In embodiments, the electronic device may display the interface 655 in response to detecting a selection of the "YES" selection 652 of the interface 650. The interface 655 may include various information associated with the exemplary replacement air conditioning unit. In particular, as illustrated in FIG. 6B, the information may include an image, a brand, a model, a cost or price, and/or an availability. It should be appreciated that the interface 655 may include alternate or additional information.

The user may view the information of the interface 655 to gauge whether to purchase the replacement air conditioning unit. As depicted in FIG. 6B, the interface 655 may include a set of selections that enable the user to facilitate various functionalities. In particular, the user may select a "CANCEL" selection 656 to cause the electronic device to exit out of the interface 655 and/or proceed to another interface; a "MORE INFO" selection 657 to cause the electronic device to access various additional information associated with the replacement air conditioning unit and/or the purchase thereof; and a "PURCHASE" selection 658 to cause the electronic device to facilitate a purchase of the replacement air conditioning unit with the user. It should be appreciated that additional functionalities are envisioned. For example, the user interface 655 may enable the user to view alternate replacement air conditioning unit options and/or alternate purchasing channels. The user interface 655 may also allow the user to schedule or otherwise arrange third party installation of the replacement refrigerator, and/or other actions.

VII. Exemplary Method of Monitoring Device Electrical Usage

In one aspect, a computer-implemented method of monitoring device electrical usage within a property may be provided. The property may be populated with a hardware controller in communication with a plurality of devices. The method may include (1) retrieving, by the hardware controller, electrical usage data from a device disposed within the property, (2) analyzing, by one or more processors, the electrical usage data to determine that a parameter of the electrical usage data exceeds a threshold value, (3) generating, by the one or more processors, a command to modify operation of the device to address the electrical usage data, and/or (4) sending the command to the device, wherein the device executes the command to modify the operation of the device. The method may include additional, fewer, or alternate actions, including those discussed elsewhere herein.

In an implementation, the method may further include (a) generating a notification indicating at least the command to modify operation of the device, and (b) communicating the notification to an electronic device of an individual associated with the property. Additionally, the parameter of the electrical usage data may correspond to an electrical output of the device, and analyzing the electrical usage data may include analyzing the electrical usage data to determine that the electrical output exceeds a threshold output limit. Generating the command may include generating a shutdown command to cause the device to power down.

In another implementation, the parameter of the electrical usage data may correspond to an aggregate electrical output of the device, and analyzing the electrical usage data may include analyzing the electrical usage data to determine that the electrical output exceeds a recommended aggregate output amount. Generating the command may include generating the command to cause the device to indicate that the recommended aggregate output amount has been reached. In this aspect, the method may further include (a) identifying a replacement device for the device, (b) communicating an indication of the replacement device to an electronic device of an individual associated with the property, and/or (c) scheduling an installation of the replacement device.

According to certain aspects, the method may further include receiving audio data corresponding to operation of the device, and analyzing the electrical usage data may include analyzing the electrical usage data in combination with the audio data to determine that the parameter of the electrical usage data exceeds the threshold value. Further, in an implementation, the method may further include causing power supplied to the device to be re-routed from a first power source to a second power source.

Additionally, the parameter of the electrical usage data may correspond to an electrical output of the device, and analyzing the electrical usage data may include analyzing the electrical usage data to determine that the electrical output exceeds a threshold output limit consistent with impending failure of the device. Further, generating the command may include generating a shutdown command to cause the device to power down. The method may further include communicating an indication of the impending failure of the device to an electronic device of an individual associated with the property.

In another aspect, the method may include (a) generating, based upon the electrical usage data, a recommendation to adjust operation of the device to reduce energy usage, and (b) communicating the recommendation to an electronic device of an individual associated with the property. Additionally, the method may further include receiving, from a server, data corresponding to weather conditions in a vicinity of the property, and analyzing the electrical usage data may include analyzing the electrical usage data in combination with the data corresponding to the weather conditions to determine that the parameter of the electrical usage data exceeds the threshold value.

VIII. Exemplary Hardware Controller

A hardware controller for monitoring device electrical usage within a property may be provided. The hardware controller may be in communication with a plurality of devices. The hardware controller may include a communication module adapted to retrieve device electrical usage data from a device disposed within the property, a memory adapted to store non-transitory computer executable instructions, and a processor adapted to interface with the communication module. The processor may be configured to execute the non-transitory computer executable instructions to cause the processor to (1) analyze the electrical usage data to determine that a parameter of the electrical usage data exceeds a threshold value, (2) generate a command to modify operation of the device to address the electrical usage data, and/or (3) send, via the communication module, the command to the device, wherein the device executes the command to modify the operation of the device. The processor may be configured with additional, less, or alternate functionality, including that discussed elsewhere herein.

In one aspect, the processor may be further configured to (a) generate a notification indicating at least the command to modify operation of the device, and (b) communicate, via the communication module, the notification to an electronic device of an individual associated with the property. Further, in an implementation, the parameter of the electrical usage data may correspond to an electrical output of the device, wherein to analyze the electrical usage data. The processor may configured to analyze the electrical usage data to determine that the electrical output exceeds a threshold output limit, and to generate the command, the processor may be configured to generate a shutdown command to cause the device to power down.

In certain scenarios, the parameter of the electrical usage data may correspond to an aggregate electrical output of the device. To analyze the electrical usage data, the processor may be configured to analyze the electrical usage data to determine that the electrical output exceeds a recommended aggregate output amount. To generate the command, the processor may be configured to generate the command to cause the device to indicate that the recommended aggregate output amount has been reached. In one implementation, the processor may be further configured to (a) identify a replacement device for the device, and (b) communicate, via the communication module, an indication of the replacement device to an electronic device of an individual associated with the property.

In another implementation, the communication module may be further configured to receive audio data corresponding to operation of the device, and to analyze the electrical usage data, the processor may be configured to analyze the electrical usage data in combination with the audio data to determine that the parameter of the electrical usage data exceeds the threshold value. Further, the processor may be further configured to cause power supplied to the device to be re-routed from a first power source to a second power source. Additionally, in one implementation, the parameter of the electrical usage data may correspond to an electrical output of the device, and to analyze the electrical usage data, the processor may be configured to analyze the electrical usage data to determine that the electrical output exceeds a threshold output limit consistent with impending failure of the device. To generate the command, the processor may be configured to generate a shutdown command to cause the device to power down, and the processor may be further configured to communicate, via the communication module, an indication of the impending failure of the device to an electronic device of an individual associated with the property.

In certain aspects, the processor may be further configured to generate, based upon the electrical usage data, a recommendation to adjust operation of the device to reduce energy usage, and communicate, via the communication module, the recommendation to an electronic device of an individual associated with the property. Additionally, the communication module may be further configured to receive, from a server, data corresponding to weather conditions in a vicinity of the property. To analyze the electrical usage data, the processor may be configured to analyze the electrical usage data in combination with the data corresponding to the weather conditions to determine that the parameter of the electrical usage data exceeds the threshold value.

IX. Exemplary Management of Energy Consumption and Utility Usage

In certain methods, the wired or wireless communication or data transmission, and/or data, received and/or analyzed by the smart home controller or remote processor may include electrical load data transmitted by a smart outlet or smart circuit breaker; and/or the smart home controller or remote processor may be configured to determine that an electric load for a smart appliance is excessive or over a pre-determined threshold from analysis of the electrical load data received, and/or then automatically disconnect or turn off the smart appliance and/or send the insured a warning or other electronic message.

In one implementation, the wired or wireless communication or data transmission, and/or data, received and/or analyzed by the smart home controller or remote processor may include electrical load data associated with electricity consumption by a piece of equipment; and/or the smart home controller or remote processor may be configured to determine that the piece of equipment is nearing an end of its useful life or should be replaced from analysis of the electrical load data received, and/or and then automatically determine a recommended replacement piece of equipment, and recommend that replacement piece of equipment to the insured, such as via wireless communication, and/or enable the user to schedule an installation of the replacement piece of equipment.

In another implementation, the wired or wireless communication or data transmission, and/or data, received and/or analyzed by the smart home controller or remote processor may include audio data associated with a running or operating piece of equipment (e.g., sound of a pump, motor, dish washer, clothes washer or dryer, sump pump or sump pump motor, etc.); and/or the smart home controller or remote processor may be configured to determine that the piece of equipment is nearing an end of its useful life or should be replaced from analysis of the audio data received, and/or then automatically determine a recommended replacement piece of equipment, and recommend that replacement piece of equipment to the insured, such as via wireless communication.

Additionally, in one implementation, the wired or wireless communication or data transmission, and/or data, received and/or analyzed by the smart home controller or remote processor may include electrical load data associated with electricity consumption within an insured home; and/or the smart home controller or remote processor may be configured to re-route electric power from an electric vehicle to a generator, sump pump, refrigerator, air condition unit, or other equipment during a power outage.

Further, in another implementation, the wired or wireless communication or data transmission, and/or data, received and/or analyzed by the smart home controller or remote processor may include electrical load data associated with electricity consumption within an insured home; and/or the smart home controller or remote processor may be configured to notify the insured of large increases in usage or usage spikes that are indicative of equipment failure or impending failure, such as a sump pump (or other motor or equipment) running continuously and failing to properly turn off or otherwise cycle.

The wired or wireless communication or data transmission, and/or data, received and/or analyzed by the smart home controller or remote processor may include electrical usage information related to electricity consumption within an insured home; and/or the smart home controller or remote processor may be configured to determine and then make a recommendation about energy usage to the insured that offers electricity cost savings to the insured. In one aspect, the smart home controller or remote processor may receive a notification of severe weather in the vicinity of the insured home, such as via wired or wireless communication; and/or based upon the notification, the smart home controller or remote processor may direct a smart electrical system of the insured home to shut off or de-energize specific, or even all, loads (e.g., appliances, electrical devices, etc.) to prevent damage to the loads (e.g., de-energize expensive televisions, electronic devices, or computers) during a thunderstorm or other event that may cause a power surge.

X. Additional Embodiments

The wired or wireless communication or data transmission, and/or data, received and/or analyzed by the smart home controller or remote processor may indicate that a new appliance or other equipment has been installed improperly, such as in a configuration that results in improper electrical usage. In response, and/or based upon the analysis by the smart home controller or remote processor of the wired or wireless communication or data transmission, and/or data received, the smart home controller or remote processor may then generate a corresponding message or wireless communication to the insured indicating such (i.e., improper installation of the new appliance or other equipment). The smart home controller or remote processor may determine that the new appliance has been installed improperly from analysis of (1) images of the new appliance, (2) electrical or water usage by the new appliance, and/or (3) water flow or air flow associated with the new appliance, such as by the smart home controller or remote processor comparing (i) actual images of the new appliance with expected images (such as images of similar appliances) stored in a memory unit or data structure, (ii) actual electrical or water usage of, or by, the new appliance with expected electrical or water usage (such as usage of, or by, similar appliances) stored in a memory unit or data structure; and/or (iii) actual water or air flow associated with the new appliance with expected water or air flow (such flow as associated with similar appliances) stored in a memory unit or data structure. The air flow may be associated with an air conditioning unit, furnace, ventilation system, or clothes dryer exhaust, and the smart home controller or remote processor may determine that the air flow is abnormal and/or lower than expected (indicating actual or potential air flow blockage, leakage, or other abnormalities).

The wired or wireless communication or data transmission, and/or data, received and/or analyzed by the smart home controller or remote processor may indicate that a tiny home has been built or installed improperly. In response, and/or based upon the analysis by the smart home controller or remote processor of the wired or wireless communication or data transmission, and/or data received, the smart home controller or remote processor may then generate a corresponding message or wireless communication to the insured indicating such (i.e., improper installation of the tiny home). The smart home controller or remote processor may determine that the tiny home has been built or installed improperly from analysis of (1) internal and/or exterior images of the tiny home, (2) electrical or water usage by the tiny home, and/or (3) water flow or air flow associated with the tiny home, such as by the smart home controller or remote processor comparing (i) actual images of the tiny home with expected images (associated with other tiny homes) stored in a memory unit or data structure, (ii) actual electrical or water usage of, or by, the tiny home with expected electrical or water usage (of, or by, average tiny homes) stored in a memory unit or data structure; and/or (iii) actual water or air flow of the tiny home, with expected water or air flow (such as that associated with other or average tiny homes) stored in a memory unit or data structure. The air flow may be associated with an air conditioning unit, furnace, ventilation system, or clothes dryer exhaust, and the smart home controller or remote processor may determine that the air flow is abnormal and/or lower than expected.

XI. Exemplary Energy Consumption & Utility Usage

The methods related to smart home control and/or automation detailed elsewhere herein may also include actions directed to energy consumption and/or utility usage. For instance, the wired or wireless communication or data transmission, and/or data, received and/or analyzed by the smart home controller or remote processor may include electrical load data transmitted by a smart outlet or smart circuit breaker. The smart home controller or remote processor may be configured to determine that an electric load for a smart appliance is excessive or over a pre-determined threshold from analysis of the electrical load data received by the smart home controller or remote processor, and then automatically disconnect or turn off the smart appliance and/or send the insured a corresponding warning message.

The wired or wireless communication or data transmission, and/or data, received and/or analyzed by the smart home controller or remote processor may include electrical load data associated with electricity consumption by a piece of equipment. The smart home controller or remote processor may be configured to determine that the piece of equipment is nearing an end of its useful life or should be replaced from analysis of the electrical load data received by the smart home controller or remote processor, and then automatically determined a replacement piece of equipment, and recommend the replacement piece of equipment to the insured, such as via wireless communication.

The wired or wireless communication or data transmission, and/or data, received and/or analyzed by the smart home controller or remote processor may include audio data associated with a running or operating piece of equipment (e.g., sound of a pump, motor, dish washer, clothes washer or dryer, air conditioning unit, refrigerator, furnace, sump pump or sump pump motor, etc.). The smart home controller or remote processor may be configured to determine that the piece of equipment is nearing an end of its useful life or should be replaced from analysis of the audio data received by the smart home controller or remote processor, and then automatically determine and/or recommend a replacement piece of equipment to the insured, such as via wireless communication.

The wired or wireless communication or data transmission, and/or data, received and/or analyzed by the smart home controller or remote processor may include electrical load data associated with electricity consumption within an insured home. The smart home controller or remote processor may be configured to re-route electric power from an electric vehicle to a generator, sump pump, refrigerator, or air conditioner during a power outage based upon analysis of the electricity consumption or electric load data by the smart home controller or remote processor.

The wired or wireless communication or data transmission, and/or data, received and/or analyzed by the smart home controller or remote processor may include electrical load data associated with electricity consumption within an insured home. The smart home controller or remote processor may be configured to notify the insured of large increases in usage or usage spikes that are indicative of equipment failure or impending failure, such as a sump pump running continuously and failing to properly turn off, based upon analysis of the electricity consumption or electric load data by the smart home controller or remote processor.

The wired or wireless communication or data transmission, and/or data, received and/or analyzed by the smart home controller or remote processor may include electrical usage information related to electricity consumption within an insured home. The smart home controller or remote processor may be configured to make a recommendation about energy usage to the insured that offers electricity cost savings to the insured based upon analysis of the electricity consumption or electrical usage information by the smart home controller or remote processor.

The smart home controller or remote processor may receive a notification of severe weather in the vicinity of the insured home, such as via wired or wireless communication, and then may direct a smart electrical system of the insured home to shut off or de-energize specific, or even all, loads (e.g., appliances, electrical devices, computers, televisions, etc.) to prevent damage to the loads (e.g., de-energize expensive televisions, electronic devices, or computers) during a thunderstorm or other event that may cause a power surge.

In another aspect, a computer-implemented method of smart home control and/or automation to facilitate prevention, reduction, and/or mitigation of insurance-related events may be provided. The method may include (1) receiving, at or via a remote processor (such as one or more remote processors or servers associated with an insurance provider), a wired or wireless communication or data transmission sent from, and/or data (e.g., audio and image data) collected by, (a) a mobile device of an insured, (b) one or more smart devices located within, or within a vicinity of, an insured home, and/or (c) smart home controller or network (e.g., a smart home controller or network in wired or wireless communication with the mobile device and/or one or more smart devices); (2) analyzing, at or via the remote processor, the wired or wireless communication or data transmission, and/or data, received to determine an insurance-related event has occurred or a likelihood of the insurance-related event happening; and/or (3) when it is determined that the insurance-related event has occurred or has the likelihood of happening from analysis of the wired or wireless communication or data transmission, and/or data, received, the remote processor: (I) may generate a notification or message to send to the insured and cause the notification or message to be presented to the insured, such as on a display associated with (i) the smart home controller; (ii) the mobile device of the insured; and/or (iii) the one or more smart devices located within, or within the vicinity of, the insured home, and/or (II) may direct or control (such as via wired or wireless communication) operation of one or more pieces of smart equipment within the insured home such that prevention, reduction, and/or mitigation of damage caused by, or potentially caused by, the insurance-related event to the insured home is facilitated. The foregoing two methods of smart home control and/or automation may include additional, fewer, or alternate actions, including those discussed elsewhere herein and directly below.

For instance, the one or more smart devices may include smart sensors, smart visual or audio recording equipment, smart cameras, security systems, smart drones, smart robots, and/or smart pet collars. The mobile device may include a smart phone, laptop, tablet, phablet, netbook, notebook, smart glasses, wearable electronic device, smart watch, smart contact lenses, pager, personal digital assistant (PDA), smart pet collar, or other computing device. The smart devices or mobile device may include one or more processors and transceivers, and may be configured for wired or wireless communication (including two-way radio frequency (RF) communication), such as with a smart home controller or an insurance provider remote processor or server. The smart home controller or insurance provider remote processor or server may generate, update, or adjust an insurance policy, premium, rate, or discount based upon the insurance-related event or wired or wireless communication, data transmission, or data received, such as generating, updating, or adjusting an insurance policy covering or associated with the insured, insured home, or items within the insured home or belonging to the insured.

The wired or wireless communication or data transmission, and/or data, received and/or analyzed by the smart home controller or remote processor may indicate that a circuit breaker or GFCI (Ground Fault Circuit Interrupter) has been tripped (that controls electricity to an appliance (e.g., freezer storing food) in a basement, garage, or other area or room not frequented often by the insured for example). In response, and/or based upon the analysis by the smart home controller or remote processor of the wired or wireless communication or data transmission, and/or data received, the smart home controller or remote processor may (1) determine a potential insurance-related event that may occur in the insured home due to the circuit breaker or GFCI tripping (e.g., water damage from a de-energized freezer or sump pump), (2) generate a wireless communication notifying the insured of the potential insurance-related event, and/or (3) transmit the wireless communication to the mobile device of the insured to cause a presentation of a corresponding notification on a display screen of the mobile device.

The wired or wireless communication or data transmission, and/or data, received and/or analyzed by the smart home controller or remote processor may indicate an age of an appliance. In response, and/or based upon the analysis by the smart home controller or remote processor of the wired or wireless communication or data transmission, and/or data received, the smart home controller or remote processor may (1) determine that the appliance needs to be repaired or replaced (such as by determining that the appliance's warranty is about to expire or has expired), and/or (2) generate a recommendation to the insured that the appliance should be either repaired or replaced (e.g., the smart home controller or remote processor may determine that it is more cost effective to replace an old appliance with a new appliance (having a new warranty) than it is to repair the old appliance (having an expired or expiring warranty)).

XII. Additional Considerations

As used herein, the term "smart" may refer to devices, sensors, or appliances located within or proximate to a property, and with the ability to communicate information about the status of the device, sensor, or appliance and/or receive instructions that control the operation of the device, sensor, or appliance. In one instance, a smart thermostat may be able to remotely communicate the current temperature of the home and receive instructions to adjust the temperature to a new level. In another instance, a smart water tank may be able to remotely communicate the water level contained therein and receive instructions to restrict the flow of water leaving the tank. In contrast, "dumb" devices, sensors, or appliances located within or proximate to a property require manual control (as compared to automatic or semi-automatic or processor control associated with smart devices). Referring again to the thermostat embodiment, to adjust the temperature on a "dumb" thermostat, a person would have to manually interact with the thermostat. As such, a person is unable to use a communication network to remotely adjust a "dumb" device, sensor, or appliance.

A "smart device" as used herein may refer to any of a smart device, sensor, appliance, and/or other smart equipment that may be located (or disposed) within or proximate to a property. In some embodiments in which an appliance and a sensor external to the particular appliance are associated with each other, "smart device" may refer to both the external sensors and the appliance collectively. Some exemplary devices that may be "smart devices" are, without limitation, valves, piping, clothes washers/dryers, dish washers, refrigerators, sprinkler systems, toilets, showers, sinks, soil monitors, doors, locks, windows, shutters, ovens, grills, fire places, furnaces, lighting, sump pumps, security cameras, and alarm systems. Similarly, an individual associated with the property shall be referred to as the "homeowner," "property owner," or "policyholder," but it is also envisioned that the individual is a family member of the homeowner, a person renting/subletting the property, a person living or working on the property, a neighbor of the property, or any other individual that may have an interest in preventing or mitigating damage to the property.

Further, any reference to "home" or "property" is meant to be exemplary and not limiting. The systems and methods described herein may be applied to any property, such as offices, farms, lots, parks, and/or other types of properties or buildings. Accordingly, "homeowner" may be used interchangeably with "property owner."

With the foregoing, an insurance customer may opt-in to a rewards, insurance discount, or other type of program. After the insurance customer provides their affirmative consent, an insurance provider remote server may collect data from the customer's mobile device, smart home controller, or other smart devices—such as with the customer's permission or affirmative consent. The data collected may be related to smart home functionality (or device management based upon electricity usage functionality), and/or insured assets before (and/or after) an insurance-related event, including those events discussed elsewhere herein. In return, risk averse insureds, home owners, or home or apartment occupants may receive discounts or insurance cost savings related to home, renters, personal articles, auto, and other types of insurance from the insurance provider.

In one aspect, smart or interconnected home data, and/or other data, including the types of data discussed elsewhere herein, may be collected or received by an insurance provider remote server, such as via direct or indirect wireless communication or data transmission from a smart home controller, mobile device, or other customer computing device, after a customer affirmatively consents or otherwise opts-in to an insurance discount, reward, or other program. The insurance provider may then analyze the data received with the customer's permission to provide benefits to the customer. As a result, risk averse customers may receive insurance discounts or other insurance cost savings based upon data that reflects low risk behavior and/or technology that mitigates or prevents risk to (i) insured assets, such as homes, personal belongings, or vehicles, and/or (ii) home or apartment occupants.

Although the following text sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For instance, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For instance, where the hardware modules comprise a general-purpose processor configured using software, the general-purpose processor may be configured as respective different hardware modules at different times. Software may accordingly configure a processor, for instance, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for instance, through the storage and retrieval of information in memory structures to which the multiple hardware modules have access. For instance, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, comprise processor-implemented modules.

Similarly, the methods or routines described herein may be at least partially processor-implemented. For instance, at least some of the operations of a method may be performed by one or more processors or processor-implemented hardware modules. The performance of certain of the operations may be distributed among the one or more processors, not only residing within a single machine, but deployed across a number of machines. In some exemplary embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some exemplary embodiments, the one or more processors or processor-implemented modules may be located in a single geographic location (e.g., within a home environment, an office environment, or a server farm). In other exemplary embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The terms "insurer," "insuring party," and "insurance provider" are used interchangeably herein to generally refer to a party or entity (e.g., a business or other organizational entity) that provides insurance products, e.g., by offering and issuing insurance policies. Typically, but not necessarily, an insurance provider may be an insurance company.

Although the embodiments discussed herein relate to home or personal property insurance policies, it should be appreciated that an insurance provider may offer or provide one or more different types of insurance policies. Other types of insurance policies may include, for instance, condominium owner insurance, renter's insurance, life insurance (e.g., whole-life, universal, variable, term), health insurance, disability insurance, long-term care insurance, annuities, business insurance (e.g., property, liability, commercial auto, workers compensation, professional and specialty liability, inland marine and mobile property, surety and fidelity bonds), automobile insurance, boat insurance, insurance for catastrophic events such as flood, fire, volcano damage and the like, motorcycle insurance, farm and ranch insurance, personal liability insurance, personal umbrella insurance, community organization insurance (e.g., for associations, religious organizations, cooperatives), personal articles, and/or other types of insurance products. In embodiments as described herein, the insurance providers process claims related to insurance policies that cover one or more properties (e.g., homes, automobiles, personal property), although processing other insurance policies is also envisioned.

The terms "insured," "insured party," "policyholder," "customer," "claimant," and "potential claimant" are used interchangeably herein to refer to a person, party, or entity (e.g., a business or other organizational entity) that is covered by the insurance policy, e.g., whose insured article or entity (e.g., property, life, health, auto, home, business) is covered by the policy. A "guarantor," as used herein, generally refers to a person, party or entity that is responsible for payment of the insurance premiums. The guarantor may or may not be the same party as the insured, such as in situations when a guarantor has power of attorney for the insured. An "annuitant," as referred to herein, generally refers to a person, party or entity that is entitled to receive benefits from an annuity insurance product offered by the insuring party. The annuitant may or may not be the same party as the guarantor.

As used herein, the terms "comprises," "comprising," "includes," "including," "has," "having" or any other variation thereof, are intended to cover a non-exclusive inclusion. For instance, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For instance, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

The patent claims at the end of this patent application are not intended to be construed under 35 U.S.C. § 112(f) unless traditional means-plus-function language is expressly recited, such as "means for" or "step for" language being explicitly recited in the claim(s).

This detailed description is to be construed as examples and does not describe every possible embodiment, as describing every possible embodiment would be impractical, if not impossible. One could implement numerous alternate embodiments, using either current technology or technology developed after the filing date of this application.

What is claimed:

1. A computer-implemented method of monitoring device electrical usage within a property, the property populated with a hardware controller in communication with a plurality of devices, the method comprising:
    retrieving, by the hardware controller, (i) electrical usage data from a device disposed within the property and powered by a first power supply, and (ii) audio data corresponding to operation of the device;
    analyzing, by one or more processors of the hardware controller, the electrical usage data in combination with the audio data to determine that the device is not receiving any power from the first power supply;
    in response to determining that the device is not receiving any power from the first power supply, generating, by the one or more processors, a command to re-route a supply of power for the device from the first power supply to a second power supply; and
    sending the command to the hardware controller, wherein the hardware controller causes the supply of power for the device to be re-routed from the first power supply to the second power supply.

2. The computer-implemented method of claim 1, further comprising:
    generating a notification indicating at least the command to re-route the supply of power; and
    communicating the notification to an electronic device of an individual associated with the property.

3. The computer-implemented method of claim 1, further comprising:
    receiving, from a server, data corresponding to weather conditions in a vicinity of the property;
    wherein analyzing the electrical usage data in combination with the audio data comprises:
        analyzing the electrical usage data in combination with the audio data and the data corresponding to the weather conditions to determine that the device is not receiving any power from the first power supply.

4. A hardware controller for monitoring device electrical usage within a property, the hardware controller in communication with a plurality of devices, comprising:
    a transceiver for retrieving (i) electrical usage data from a device disposed within the property and powered by a first power supply and (ii) audio data corresponding to operation of the device;
    a memory storing non-transitory computer executable instructions; and
    a processor interfacing with the communication module and the memory, wherein the processor is configured to execute the non-transitory computer executable instructions to cause the processor to:
        analyze the electrical usage data in combination with the audio data to determine that the device is not receiving any power from the first power supply,
        in response to determining that the device is not receiving any power from the first power supply, generate a command to re-route a supply of power for the device from the first power supply to a second power supply, and
        cause the supply of power for the device to be re-routed from the first power supply to the second power supply.

5. The hardware controller of claim 4, wherein the processor is further configured to:
    generate a notification indicating at least the command to re-route the supply of power, and
    communicate, via the transceiver, the notification to an electronic device of an individual associated with the property.

6. The hardware controller of claim 4, wherein the communication module is further configured to:
    receive, from a server, data corresponding to weather conditions in a vicinity of the property;
    wherein to analyze the electrical usage data in combination with the audio data, the processor is configured to:
        analyze the electrical usage data in combination with the audio data and the data corresponding to the weather conditions to determine that the device is not receiving any power from the first power supply.

* * * * *